United States Patent [19]
Eleftheriadis et al.

[11] Patent Number: 6,055,330
[45] Date of Patent: Apr. 25, 2000

[54] METHODS AND APPARATUS FOR PERFORMING DIGITAL IMAGE AND VIDEO SEGMENTATION AND COMPRESSION USING 3-D DEPTH INFORMATION

[75] Inventors: Alexandros Eleftheriadis; Dimitris Anastassiou; Shif-Fu Chang; Shree Nayar, all of New York, N.Y.

[73] Assignee: The Trustees of Columbia University in the City of New York, New York, N.Y.

[21] Appl. No.: 08/723,467

[22] Filed: Oct. 9, 1996

[51] Int. Cl.[7] .................................................. H04N 7/18
[52] U.S. Cl. .......................................... 382/154; 382/236
[58] Field of Search .................................. 382/154, 236, 382/171, 173, 255, 291, 240, 251; 348/42–50, 397, 398, 405, 419

[56] References Cited

U.S. PATENT DOCUMENTS

| | | | |
|---|---|---|---|
| 4,893,183 | 1/1990 | Nayar | 348/42 |
| 5,309,232 | 5/1994 | Hartung et al. | 348/384 |
| 5,500,673 | 3/1996 | Zhou | 348/156 |
| 5,577,130 | 11/1996 | Wu | 382/154 |
| 5,617,334 | 4/1997 | Tseng et al. | 364/514 R |

OTHER PUBLICATIONS

"Visual Communications and Image Processing '94" by A.K. Katsaggelos; SPIE (The Society of Photo–Optical Instrumentation Engineers); vol. 2308; Sep. 25–29, Chicago, Illinois; pp. 1576–1591.

"Stereo Imaging in Low Bitrate Video Coding" by Venter et al.; Dept. of Electronic and Computer Engineering, University of Pretoria, South Africa; COMSIG 1989, Proceedings—Jun. 23, 1989; pp. 115–118.

"Low Bitrate Video Coding with Depth Compensation" by Van Schalkwyk et al.; IEE Proc.–Vis. Image Signal Process, vol. 141, No. 3, Jun. 1994; pp. 148–153.

*Primary Examiner*—Thomas D. Lee
*Assistant Examiner*—Stephen Brinich
*Attorney, Agent, or Firm*—Baker & Botts, L.L.P.

[57] ABSTRACT

Apparatus and methods for identifying one or more separate objects within depth information which corresponds to a fleid or a frame of video information are disclosed. In a preferred embodiment, an appratus includes an object map generation circuit for receiving depth information and for converting depth information into an object map to associate each pixel within the frame of video information with one of one or more regions of varying perceptual importance is disclosed. This preferred apparatus also includes a region masking circuit for masking the object map to generate one or more depth region masks indicative of pixels within the frame which substantially correspond to preselected regions of depth, and a video object selection circuit for identifying one or more separate objects within each of the one or more preselected regions indicated by each of the one or more region masks, such that each object associated with each depth region is identified as a separate object.

49 Claims, 14 Drawing Sheets

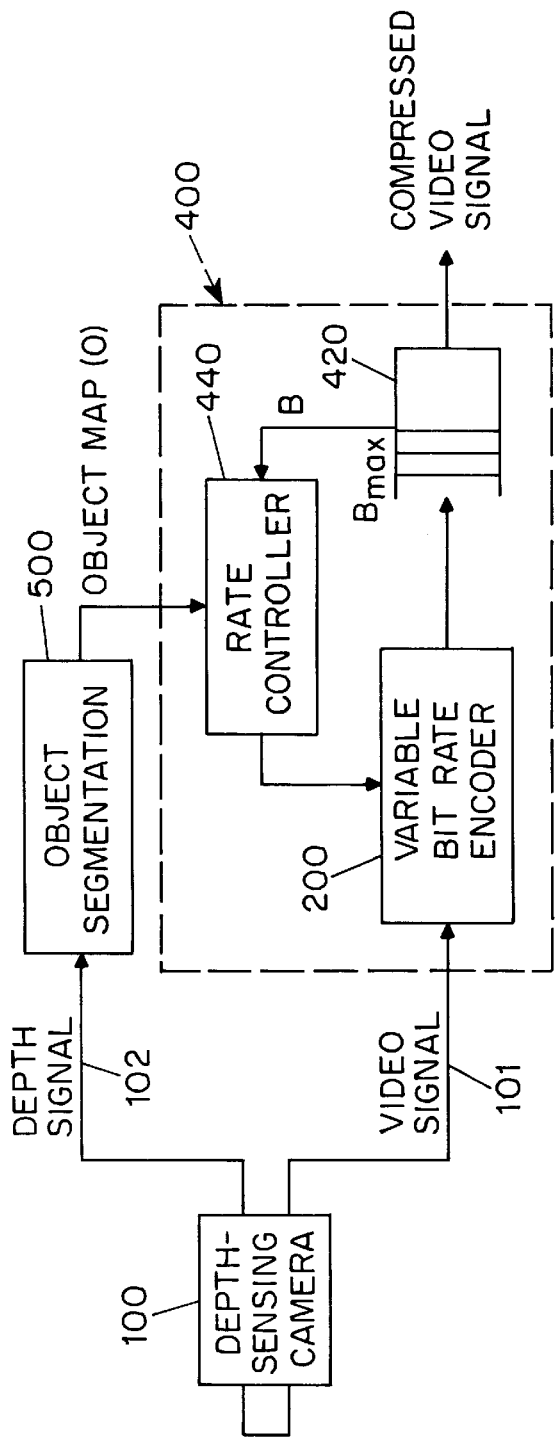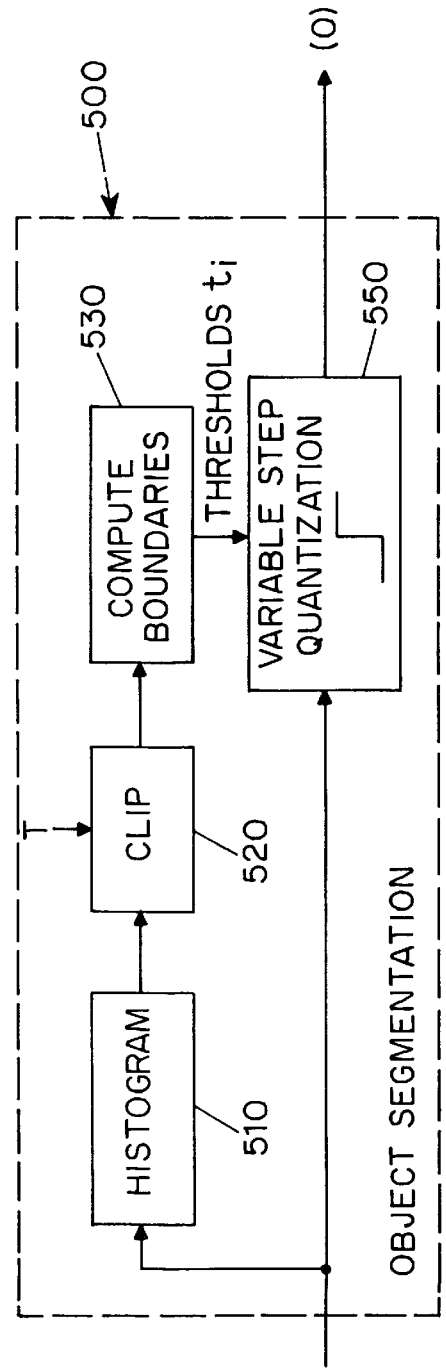

METHODS AND APPARATUS FOR PERFORMING DIGITAL IMAGE AND VIDEO SEGMENTATION AND COMPRESSION USING 3-D DEPTH INFORMATION

BACKGROUND OF THE INVENTION

I. Field of the Invention

The present invention relates to techniques for digital image and video segmentation and compression, and more specifically, digital image and video compression techniques which make use of three dimensional shape information as part of the video segmentation and compression processes.

II. Description of the Related Art

In recent years, numerous techniques for digital image and video compression have been introduced. Current image/video compression standards such as JPEG, H.261, MPEG-1, MPEG-2, H.263, which do not have the inherent capability to encode semantically different visual objects separately, treat content as a two or three dimensional (2-D space plus time) array of pixels on which redundancy reduction techniques are applied. In such standard techniques, the Discrete Cosine Transform ("DCT") is utilized in order to transform 8×8 blocks of pixel data into the DCT domain where quantization is more readily performed. Run-length encoding and entropy coding (i.e., Huffman coding) are applied to the quantized bitstream to produce a compressed bitstream which has a significantly reduced bit rate than the original uncompressed source signal. The process is assisted by additional side information, in the form of motion vectors, which are used to construct frame or field-based predictions from neighboring frames or fields by taking into account the inter-frame or inter-field motion that is typically present. As of the date of preparation of this patent document, numerous personal and commercial applications, such as satellite television, digital-video-disks ("DVDs"), and computer video adapters utilize one or more of the above-listed techniques in order to enhance the video capability of the application. Numerous additional applications are contemplated, especially in the case of MPEG-2.

Other more recently developed image/video compression techniques, such as the MPEG-4 standardization effort by the ISO/IEC JTC1/SC29/WG11 group, posses the inherent capability to encode semantically different visual objects separately. MPEG-4 utilizes an object-based structure to provide for the independent coding of objects of the same frame or sequence and the capability to incorporate synthetic audio and graphics objects. A complete description of the MPEG-4 compression technique, including the MPEG-4 System Description Language (MSDL), is contained in ISO document ISO/IEC JTC1/SC29/WG11 N1277 (July 1996), the disclosure of which is incorporated by reference herein. While most current video compression techniques are frame or field-based, MPEG-4 provides a flexible and extensible compression technique which is not limited to field or frame based compression. Thus, with the advent of frame or field-based compression techniques such as MPEG-2, and object-based compression techniques such as MPEG-4, there has been a revolution in the art of video compression during the early and mid 1990's.

Concurrently with this video compression revolution, there have also been great strides in the art of video capture. In particular, optical sensors that are capable of delivering depth information for a scene in real time, i.e., a "depth camera" are now feasible. Such a device is capable of producing a regular video signal in digital form at 30 or 25 frames per second (e.g., a NTSC or PAL signal), and also producing at the same frame rate an estimate of the distance of the pixels of the captured image from a fixed point or plane, such as the focal center of the camera. Such distance or three-dimensional shape information is also delivered by the sensor in digital form. One such sensor has been described in both active configuration, where a special illumination pattern is required, and in a passive configuration in Shree Nayer et al., "Real Time Focus Range Sensor," Proceedings Int'l Conf. Computer Vision pp. 995–1001 (IEEE 1995), the disclosure of which is incorporated by reference herein.

There have been several attempts to make use of three dimensional shape information as part of the video compression process. For example, J. J. D. van Schalkwyk et al., "Low Bitrate Video Coding with Depth Compensation," IEEE Proceedings: Vision, Image and Signal Processing, Vol. 141, No. 3, pp. 149–53 (1994), discloses a video compression technique which makes use of three-dimensional depth information generated by a depth-sensing algorithm in order to separate moving objects from static background. In the disclosed technique, a stereo algorithm is used to extract depth information from the scene and to locate the edges of objects within the scene. The form of the object is taken on a sub-block basis as the area covering the object as a whole. Global motion vectors, which represent the motion or displacement of the object as a whole from one frame to another, are generated by correlating the object's position vectors of the previous and present frames. During the prediction process, the global motion vectors are used to displace objects in a previous frame of data in order to generate a "globally compensated frame" of data that may be used as a first-order prediction of the present frame. The globally compensated frame replaces the past frame of data in a standard field or frame-based compression process in order to generate a more accurate representation of the scene.

In M. A. H. Venter et al., "Stereo Imaging in Low Bitrate Video Coding," COMSIG 1989—Proceedings South Africa Conference [of] Communication Signal Processing, pp. 115–118 (IEEE Jun. 23, 1989), two video compression techniques which make use of three dimensional depth information retrieved by a stereo imaging camera are disclosed. In the first technique, Venter et al. disclose the use of depth information to generate an "object motion vector" as a check on the accuracy of motion vectors which are generated in a normal coding algorithm, i.e., if a generated motion vector substantially differs from the object motion vector, it is assumed to be incorrect and is therefore replaced by the object motion vector. In the second technique, the reference proposes that depth information can be used to create a three-dimensional model of a moving object in a scene, e.g., the head and shoulders of a person, which can be reoriented and used for image prediction by projecting the three-dimensional model onto a two-dimensional image plane.

In Bernd Girod, "Image Sequence Coding Using 3D Scene Models," Proceedings of SPIE—The International Society for Optical Engineering, Vol. 2308, pp. 1576–1591 (SPIE 1994), two video compression techniques which make use of three dimensional depth information retrieved by a depth-sensing camera are also disclosed. In the first technique, Girod discloses the "implicit" use of depth information to generate a matrix which represents the translational and rotational movement of a rigid body, that is used during block matching as a constraint on the motion vector field to yield more accurate motion compensation. In the second technique, depth information is explicitly used to generate a model of a moving object, e.g., a head, which is transmitted to a receiver along with preselected facial motion parameters (e.g., mouth opening, head rotation, etc.) in order to effectuate facial animation.

The above-mentioned prior art techniques fail to adequately bridge the gap between current field or frame based video compression techniques and three-dimensional video retrieval techniques, because in each of the prior art techniques, three-dimensional shape information is used only in a tangential manner, e.g., in order to generate a first-order prediction of a frame of video data or as a check on the accuracy of motion vectors, rather than in a direct manner. Moreover, where the prior art techniques discuss the use of three-dimensional shape information in the context of object based compression, the do so only to create a three-dimensional model of a moving object, rather than in a direct manner to assist in the compression process. Thus, there exists a need for a technique which directly utilizes three-dimensional shape information in the video compression process, both in the case of field or frame based compression techniques and in the case of object-based compression techniques.

SUMMARY OF THE INVENTION

An object of the present invention is to provide a technique which directly utilizes shape information in the video compression process, both in the case of field or frame based compression techniques and in the case of object-based compression techniques.

A further object of the present invention is to provide a technique which utilizes depth information generated by a depth-sensing camera in a field or frame based video compression process by enabling selective bit-allocation during the compression process.

An additional object of the present invention is to provide a technique which utilizes depth information in an object based video compression technique to accurately represent the object during compression.

A still further object of the present invention is to provide a technique that utilizes depth information to assign perceptual significance to different objects in a frame according to the objects' positions in space.

Yet another object of the present invention is to provide a modified MPEG-2 encoder which utilizes three-dimensional shape information by quantizing objects with low perceptual importance at a high granularity, and objects with high perceptual importance at a low granularity.

Yet a further object of the present invention is to provide a modified MPEG-4 encoder which utilizers three-dimensional shape information as a robust means to perform segmentation of content into individual objects.

In order to meet these and other objects which will become apparent with reference to further disclosure set forth below, the present invention provides an object segmentation circuit for receiving depth information which corresponds to a frame of video information and for identifying one or more separate objects within the frame of video information, and includes an object map generation circuit for converting the depth information into an object map in order to associate each pixel within the frame of video information with one of one or more regions of varying perceptual importance within the frame. The object segmentation circuit also includes a region masking circuit for masking the object map to generate one or more depth region masks that are indicative of pixels within the frame which substantially correspond to preselected regions of depth, and a video object selection circuit for identifying one or more separate objects within each of the one or more preselected regions indicated by each of the one or more region masks, so that each object associated with each depth region is identified as a separate object.

Preferably, the object map generation circuit includes a histogram generation circuit for computing a histogram of the depth information in order to provide the number of pixels which have a predetermined depth value for a range of predetermined values, a first logic circuit for setting all values in the histogram which are below a predetermined threshold value to zero in order to generate a clipped histogram, a second logic circuit for scanning the clipped histogram to find boundaries of n regions with n different threshold depth values, and a variable step quantization circuit for quantizing the depth information based on the n different threshold values in order to generate the object map.

The histogram generation circuit itself may include a buffer for receiving and temporarily storing the depth information, a memory for receiving the depth information from the buffer as memory addresses and for storing histogram values as memory addresses, and a logic circuit for reading a histogram value from the memory at an address location, updating the histogram value, and providing the updated histogram value to the memory at the address location.

In one preferred embodiment, the present invention provides an apparatus for encoding fields or frames of video information in the form of a two dimensional array of pixels, using a depth component of each of those pixels to enhancing encoding, and includes an encoder for receiving frames or fields of video information and generating a compressed video signal from the received frames or fields of video information, where the encoder includes a multi-mode quantizer for quantizing data which corresponds to a portion, such as a macroblock, of the fields or frames of video information. A depth sensing camera, capable of generating in real-time both frames or fields of video information and depth information which corresponds to the video information, is preferably included in such apparatus.

This embodiment advantageously includes an object map generation circuit as well as a rate controller which provides a signal, responsive to the object map generated by the object map generation circuit, to the multi-mode quantizer to select a quantization mode such that the selected quantization mode is reflective of the perceptual importance of the regions indicated by the object map. This embodiment may be assisted by a macroblock labeling circuit, connected between the object map generation circuit and the rate controller, for assigning a current macroblock of video data to one of the regions of varying perceptual importance and for providing a signal indicative of said assigned region to the rate controller.

A video buffer having a preselected storage capacity may be coupled to the encoder and to the rate controller in order to receive and temporarily store the generated compressed video signal, and to provide a signal indicative of an overflow condition to the rate controller, so that the signal provided by said rate controller to the multi-mode quantizer is also responsive to the overflow signal.

In one especially preferred arrangement, the encoder generates an output signal when compressed video data is output to a video buffer, and the macroblock labeling circuit generates a signal indicative of a target bit rate associated with an assigned region. This arrangement beneficially includes a clock signal generating circuit for providing a clock signal to the buffer so that the buffer outputs a predetermined amount of compressed video signal in response to the clock signal, and a counter for counting the number of bits that are in a virtual buffer associated with the video buffer by adding to the count in response to the encoder output signal and subtracting from the count in response to the clock signal and the target bit rate signal in order to determine the occupancy of the virtual buffer. The counter also provides a virtual buffer occupancy signal indicative of the count to the rate controller so that the signal provided by the rate controller to the multi-mode quantizer is also responsive to the virtual buffer occupancy signal.

In order to avoid sudden changes in compression granularity, the rate controller may advantageously include a buffer size logic circuit for generating a buffer size modulation signal whenever the assigned region is different from an immediately proceeding assigned region, so that the signal provided by the rate controller to the multi-mode quantizer is responsive to the buffer size modulation signal and the selected quantization mode is reflective of the perceptual importance of the regions indicated by the virtual buffer capacity as modulated by the buffer size modulation signal and as constrained by the storage capacity of the video buffer.

In an alternative preferred arrangement, the present invention provides an apparatus for performing object-based encoding of video information using a depth component of the video information to enhance encoding, an includes an object segmentation circuit and an object-based encoder. The encoder receives the frame of video information which corresponds to the received depth information and one or more object identification signals generated by the object segmentation circuit, and generates a compressed video signal representing a portion of the video information which substantially corresponds to the one or more objects identified by the one or more object identification signals.

The present invention also provides a method for identifying one or more separate objects within depth information which corresponds to a frame of video information. The method should include the steps of receiving the depth information; converting the received depth information into an object map in order to associate each pixel within the frame of video information with one of one or more regions of varying perceptual importance within the frame; masking the object map to generate one or more depth region masks indicative of pixels within the frame which substantially correspond to preselected regions of depth; and identifying one or more separate objects within each of the one or more preselected regions indicated by the one or more region masks.

The converting step preferably includes computing a histogram of the received depth information to thereby provide the number of pixels which have a predetermined depth value for a range of predetermined values; setting all values in the histogram which are below a predetermined threshold value to zero to generate a clipped histogram; scanning the clipped histogram to find boundaries of n regions with n different threshold depth values; and quantizing the depth information based on the n different threshold values.

Favorably, the identifying step can include scanning a preselected depth region mask until a pixel with a nonmasked value is found; searching neighboring pixels within the mask to find any other neighboring pixels with nonmasked values; repeating the searching step until no neighboring pixels have a nonmasked value to identify all neighboring found pixels with nonmasked values as a video object plane which corresponds to an object within the depth region; masking the object from the depth region mask; repeating the above until all pixels within the depth region mask are masked to thereby identify one or more video object planes within the received frame of video information; selecting one of the one or more video object planes, and one of one or more video object planes associated with an immediately preceding frame of video information; comparing the selected video object plane and the selected previous frame video object plane to determine a depth difference therebetween; repeating the comparing step after selecting a different one of the one or more previous frame video object planes unless all of the one or more previous frame video object planes have been selected; and assigning the selected video object plane to a video object which corresponds to one of the one or more previous frame video object planes for which a depth difference therebetween is minimized as compared to all of the determined depth differences.

The accompanying drawings, which are incorporated and constitute part of this disclosure, illustrate a preferred embodiment of the invention and serve to explain the principles of the invention.

BRIEF DESCRIPTION OF THE DRAWINGS

FIG. 4 is a system diagram of a constant bit rate encoder in accordance with the invention;

FIG. 5 shows an object map generation circuit useful in the FIG. 4 encoder;

DESCRIPTION OF THE PREFERRED EMBODIMENTS

Figure 1:
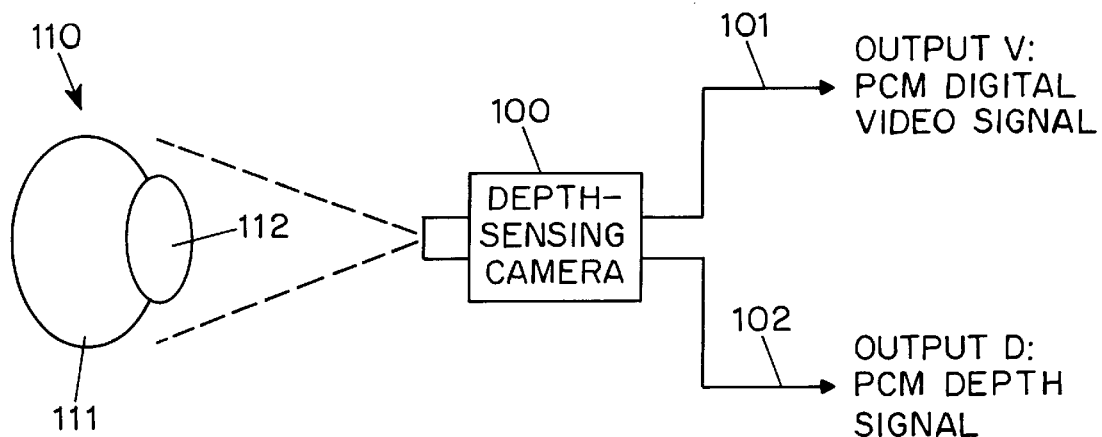
FIG. 1 is a schematic diagram of a depth-sensing camera.

Referring to FIG. 1, there is shown an operating model of a depth sensing camera 100. The camera 100 views a natural three-dimensional scene 110 which includes objects 111 and 112 at different distances or depths from the camera. The camera 100 produces two digital outputs, one 101 consisting of a standard digital video or image signal V, and a second 102 consisting of depth information D for the pixels contained in the normal video signal 101. The camera 100 may be constructed in accordance with the above discussed Nayar et al. article, or may be any other commercially available camera which produces both a standard digital video output and a depth information output.

The signal 101 preferably contains eight bits per pixel per component, in YUV 4:2:0 chroma format, although other color spaces or chroma formats could be used as well. The signal 102 preferably contains a 16-bit linear PCM representation for the depth information, although other formats, including floating point or logarithmic PCM can be used, providing different tradeoffs between complexity and accuracy.

In FIG. 1, the camera 100 will generally output a higher D value for pixels in object 111 compared to the values produced for pixels in object 112, as the object 111 is positioned farther away from the camera compared to object 112. The camera's output for a frame k can then be mathematically described by the two signals:

$$v_k(i,j) \in \{0,1,\ldots,255\}\ 0 \leq i \leq N-1\ 0 \leq j \leq M-1 \quad (1)$$

and $$d_k(i,j) \in (0,\infty)\ 0 \leq i \leq N-1\ 0 \leq j \leq M-1 \quad (2)$$

where N and M are the width and height of a frame respectively. Equation (1) ignores the chrominance components for simplicity of notation; as the different components are subjected to substantially identical processing steps (with the exception of motion estimation) so there is no need to individually identify them.

Figure 2:
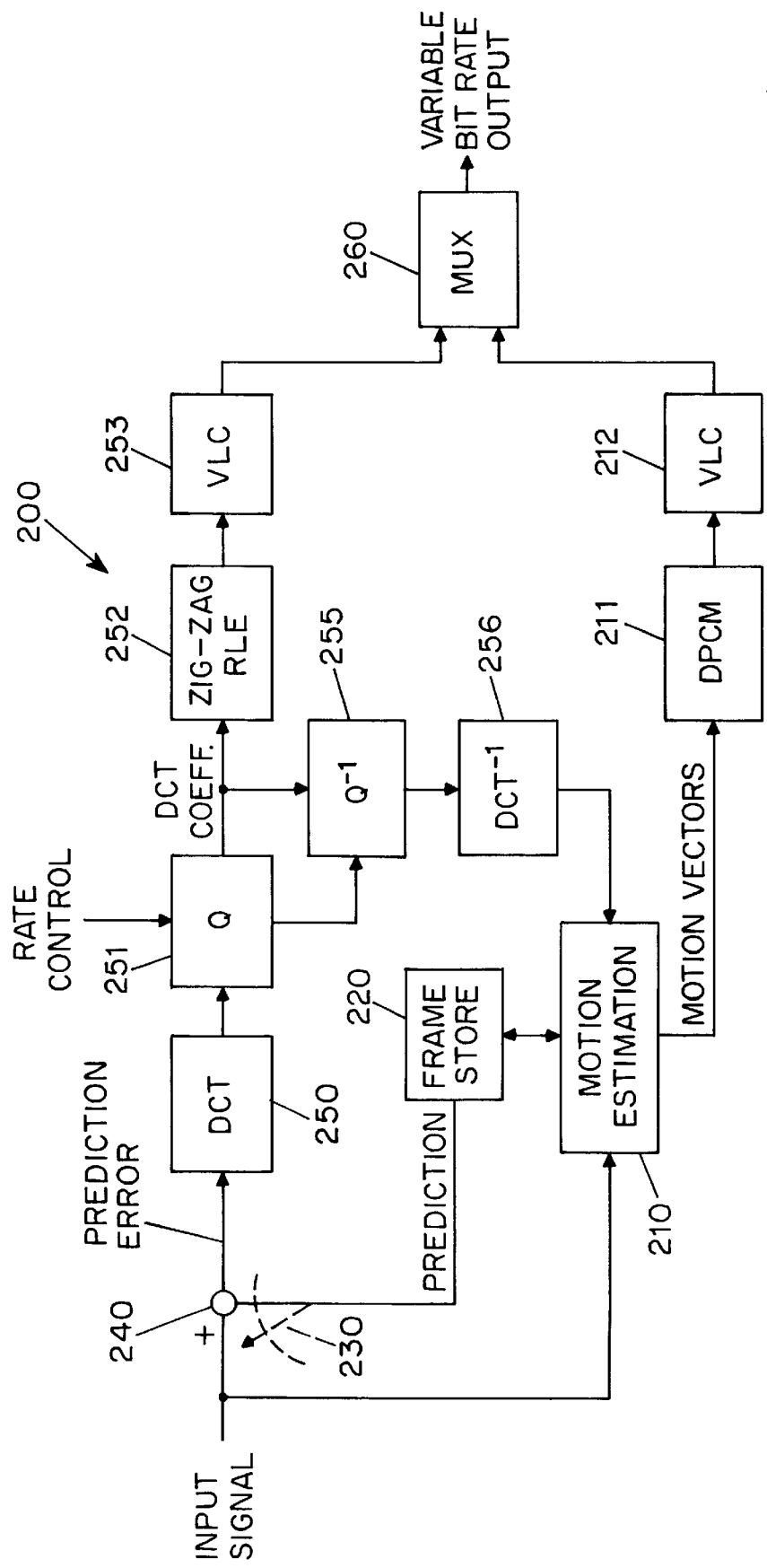
FIG. 2 is a system diagram of a typical MPEG-2 type encoder.

In FIG. 2 there is shown a system 200 for a standard field or frame based video compression technique such as H.261, MPEG-1, MPEG-2, or H.263. A normal uncompressed video signal is input to macroblock separator/adder 240 and to motion estimation circuit 210. A discrete consign transform ("DCT") 250 is applied to macroblock data from 240. To achieve greater compression efficiency, DCT coefficients are then quantized 251, Zig-Zag run-length encoded 252 and variable length coded 253. Quantized DCT coefficients are also inverse quantized 255 and inverse discrete consign transformed 256 to provide past frame video data to the motion estimation circuit 210 concurrently with present frame video data. The motion estimation circuit 210 uses the past and present frame video data, which may be stored in frame store 220, to generate motion vectors which are encoded 211, 212 and multiplexed 260 with the compressed DCT coefficients. In the case of MPEG-2, a complete description of the encoder architecture is provided in U.S. Pat. No. Re. 35,093, the disclosure of which is incorporated by reference herein.

In all cases, the encoder 200 has the flexibility of selecting a quantization mode in the quantizer 251 that is used in the compression of a particular block of video data. The selection of a fine quantization mode will produce an accurate bitstream representation for the block subject to compression, while a cowers mode will produce a more granular representation of the block. This decision affects a 2×2 array of blocks of the luminance signal, and a 2×8 array of corresponding luminance blocks, i.e., a macroblock.

The flexibility to select quantization mode at a fine scale is the means through which the encoder can effect rate control, thus producing constant bit rate ("CBR") bitstreams even though entropy (variable length) coding is used in the video compression process. Since each macroblock of data includes a header in addition to PCT coefficients for the relevant luminance and chrominance blocks, the use of a different quantizer step size can be signaled in the compressed bitstream in the headers associated with each macroblock.

Figure 3:
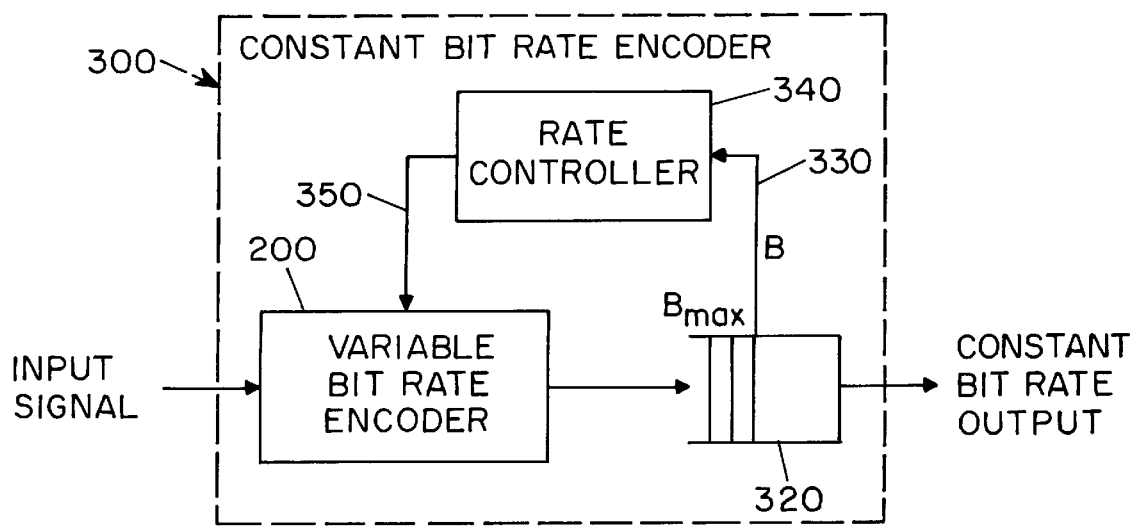
FIG. 3 is system diagram showing the conversion of a variable bit rate encoder into a constant bit rate encoder.

Referring to FIG. 3, rate control may be performed by placing a buffer 320 at the output 310 of the variable bit rate (VBR) encoder 200. In turn, the buffer 320 outputs compressed data at a constant rate which is dependant on the bandwidth of the channel which is accepting data from the buffer. The buffer's occupancy $B_{max}$ and other, possibly signal dependent, parameters are then taken into account by a rate controller 340 in order to decide the quantizer step size in quantizer 251 to be used for subsequent macroblocks so that buffer overflow or underflow does not occur.

The buffer regulation function f(.) which is calculated by the rate controller 340 can take various forms. The most simple is a "linear" relationship with the buffer occupancy B. Assuming that the quantizer factor Q can take values in the set $\{1, 2, \ldots, 31\}$, then this relationship takes the form:

$$Q = f(B) = \min\left\{\left\lfloor \frac{B}{B_{\max}} 32 \right\rfloor + 1, 31\right\} \quad (3)$$

More sophisticated functions are also well-known in the art, such as RM-8 rate control utilized in H.261, or TMN-5 rate control utilized in H.263.

Although the above is directed to a constant bit rate encoder, rate control is also usable in a purely VBR encoder to provide higher quality for some image areas of perceptual importance (e.g., a face), and less for areas that have smaller significance (e.g., background areas). In the remainder to this specification, the term rate control is used without discriminating whether or not a CBR or VBR encoder is used. In a VBR encoder, the buffer could be eliminated and the rate control function would depend only on parameters other than buffer occupancy. Alternatively, the buffer output rate can be made into a function of time, and may be known a priori or provided dynamically from the network.

In accordance with one embodiment of the present invention, depth information provided by the camera 100 is utilized by the rate control circuit 340 to partition the input frames into several different areas that are associated with different objects. These objects are assigned perceptual significance according to their position in space as well as their size. This information is in turn used in an encoder so that more bits are spent in the more significant objects, thus resulting in higher visual quality, and less bits are spent in the least significant objects such as the background.

With reference to FIG. 4, such an embodiment of the present invention is now described. A depth-sensing camera 100 provides consecutive frames of video data via cable 101 to CBR encoder 400, and for each frame of video data, an array of depth values via cable 102 to an object segmentation circuit 500. Each value in the array corresponds to the depth (or a measure thereof) of the corresponding pixel in the video signal. Object Segmentation circuit 500 converts the depth signal into an object map (O), i.e., an array of the same size in which each pixel is associated with a particular object (or the background), as more fully explained below, and provides the object map to rate controller 440 of the CBR. As described below, rate controller 440 provides a quantization mode selection signal to VBR encoder 200 to select a quantization step size depending both on the perceptual importance of the object from which data is being encoded, as well as on the current occupancy of the buffer 420.

Referring to FIG. 5, an object segmentation circuit 500 which is suitable for use in the FIG. 4 system is now described. The circuit includes a histogram generating circuit 510, a histogram clipping circuit 520, a boundary computing circuit 530, and a variable step quantizer 550.

Figure 6:
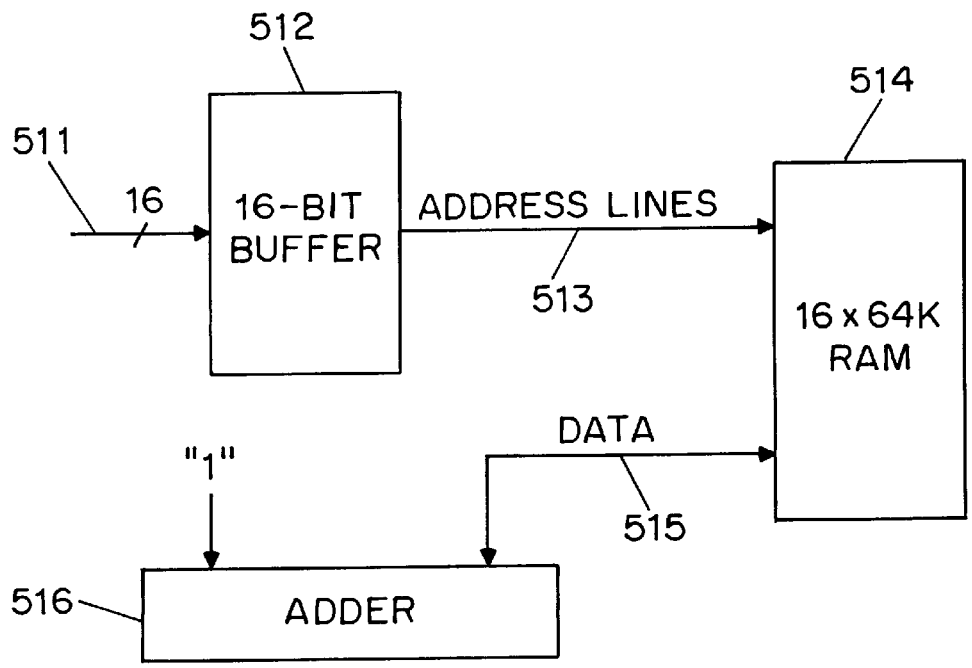
FIG. 6 shows a histogram generation circuit useful in the FIG. 5 object map generation circuit.

The histogram generating circuit 510 is shown in further detail in FIG. 6. The array of depth values, or depth map, generated by camera 100 are fed into a 16-bit wide buffer 512 via bus 511. The depth value for each pixel in the array is then input via bus 513 as the address of a 16×64K RAM 514 that contains the histogram values. An adder 516 reads the current value for the indicated RAM address via data line 515, adds the value 1, and stores the revised value back in the RAM 514 (the clocking details for the read/write stages are not shown). This creates a function which gives the number of depth map pixels of a certain depth value for each depth value that is present within the depth map.

Figure 7:
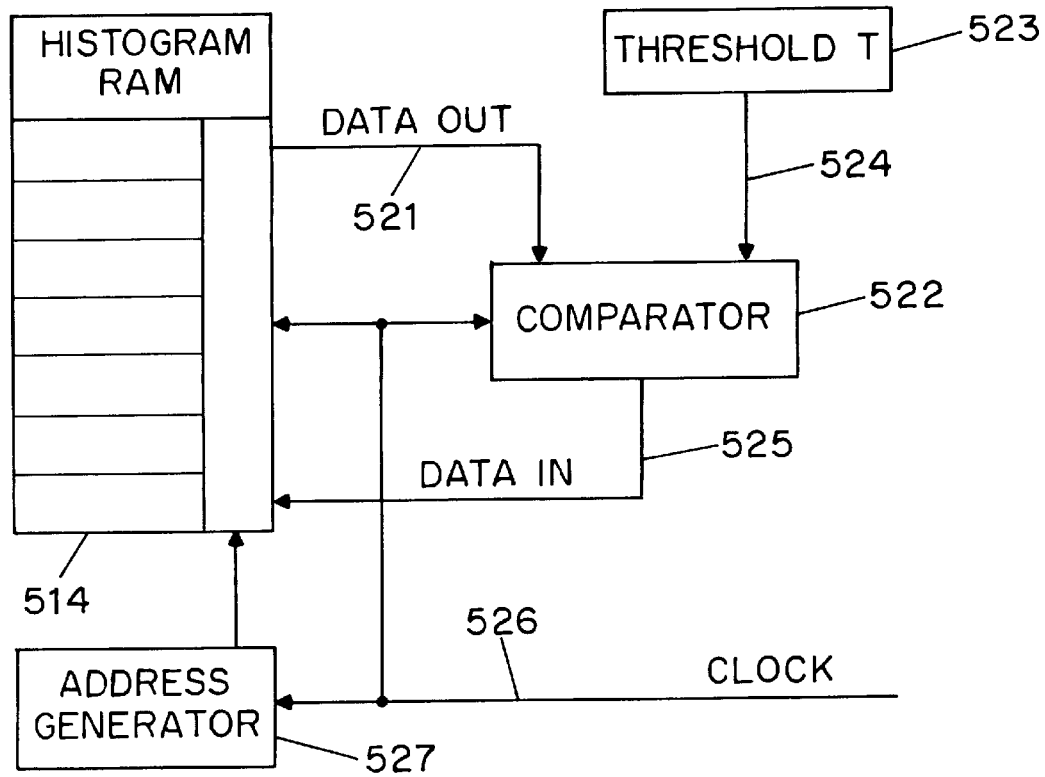
FIG. 7 shows a histogram clipping circuit useful in the FIG. 5 object map generation circuit.

FIG. 7 shows the architure of histogram clipping circuit 520. The clip circuit 520 accesses histogram RAM 514 to clip histogram entries at a threshold value T so that histogram values which are less than T are set to 0, while higher values remain unchanged. The threshold value should be experimentally determined depending on the object distances which are in the scene viewed by camera 100. Each address of RAM 514 is accessed by the generation of an address by address generator 527, which is responsive to a system clock signal 526 (clock not shown). The stored histogram value at that address is fed to a comparator 522 via line 521 and is compared with the threshold value T stored in register 523 and accessed via line 524. If the value is higher than T, it is returned to the RAM unchanged. If the value is equal to or below T, a zero is output and stored in the RAM at the same position.

Figure 8:
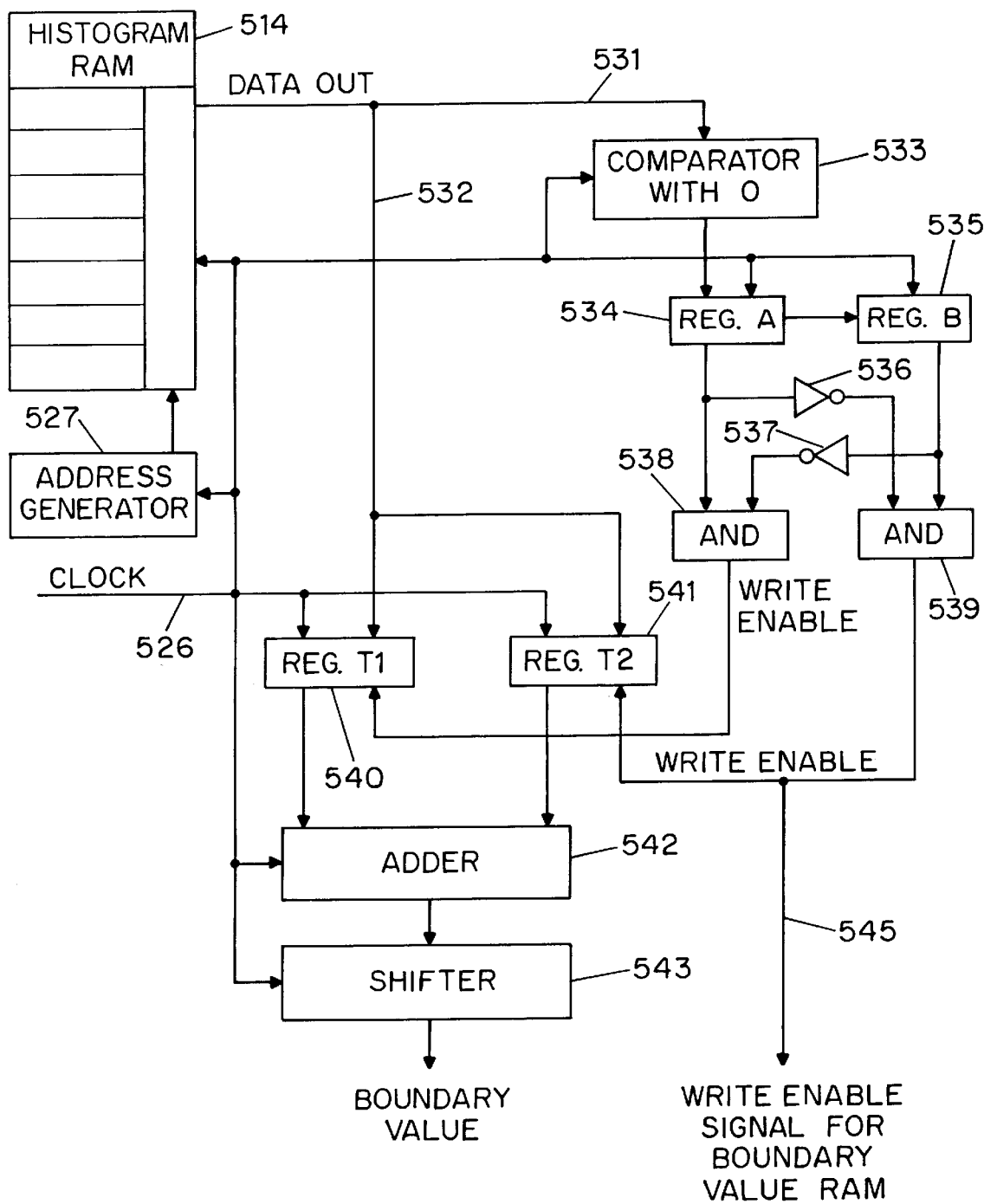
FIG. 8 shows a boundary searching circuit useful in the FIG. 5 object map generation circuit.

The details of boundary computing circuit 5303 are shown in FIG. 8. The circuit uses the thresholded histogram to identify depth points that designate ares between objects in the scene viewed by camera 100. The circuit assumes that these points correspond to the mid-points of areas of all zeros in the thresholded histogram.

Data in RAM 514 is again addressed by the address generator 527 and sent to comparator 533 via line 531, where it is compared with the value 0. If the data is a zero, a logical 1 is output by comparator 533; if the data is not a zero, a logical 0 is output. The output value is then stored in register A 534, while the previous value stored in register A is shifted to Register B 535.

Figure 9:
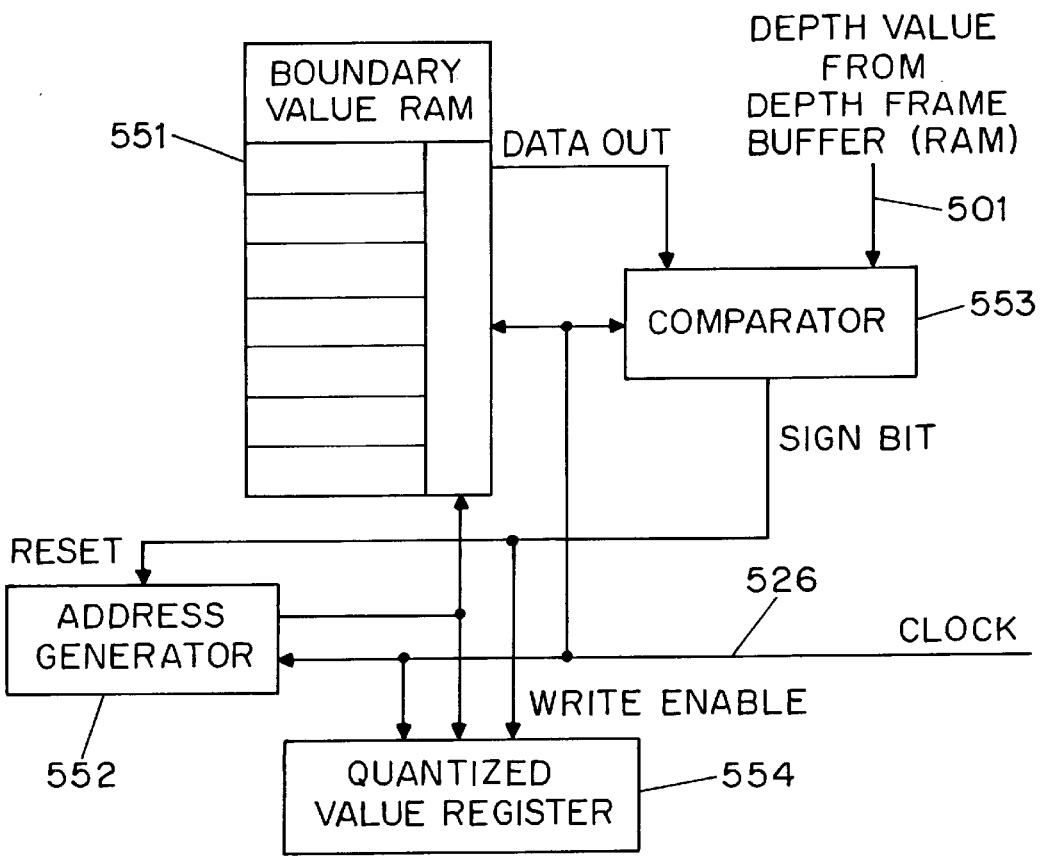
FIG. 9 shows a quantization circuit useful in the FIG. 5 object map generation circuit.

When Register A contains a 1 and register B contains a 0, a zero value of a region in the histogram has been identified. The values are combined via inverter 537 and AND gate 538 to generate a write-enable signal for register T1 540, which will hold the depth value for the beginning of the current zero-value region in the histogram. When Register A contains a 0 and Register B contains a 1, the last 0 value of the region has been identified. In such case, inverter 537 and AND gate 539 generate a write-enable signal for register T2 541, which indicates that the circuit can proceed and compute the boundary value. The boundary value is computed by adder 542, which adds the contents of T1 and T2, and shifter 543, which divides the result by two. The boundary value is stored in a Boundary Value RAM 551 (FIG. 9). The write enable signal for T2 also acts as a write enable signal for a boundary value RAM, which is described below.

In this manner, the clipped histogram is scanned to find contiguous regions where the clipped histogram has the value 0. For the i-th such region, the threshold $t_i$ is set to the middle point of the region. At the end of this process there are n different thresholds, which will separate n objects plus the assumed background.

Referring to FIG. 9, variable step quantizer 550 is shown in detail. Depth values 501 from a depth frame buffer (not shown) are fed into comparator 553 and are compared with corresponding boundary values retrieved from Boundary Value RAM 551 by address generator 552. If the depth value is less than the boundary value, the comparator outputs a 1; otherwise a 0 is output. The comparator output, a sign bit, is used as a write enable input for quantized value register 554. The register 554 is loaded with the address of the first boundary value for which the current depth value is smaller, i.e., the desired quantized value which shall be used as an object identification. The content of register 554 is then loaded into an object map RAM 1101 (FIG. 11) to associate the depth value with a particular object.

In order to prohibit further writes of the quantized value register 554 during the current depth value cycle, the sign bit output of comparator 553 also acts as a reset signal for address generator 552. Upon being reset, the address generator will generate the next address in RAM 551 for comparison with a corresponding depth value 501 in comparator 553.

In this manner, the quantizer 550 quantizes the original depth pixels map using a variable step size quantizer with the decision levels $t_i$ identified by the boundary computation circuit 530 and stored in Boundary Value RAM 551. This process generates an "object map," i.e., an association of each pixel with a particular object, which are labeled 0 through n, 0 corresponding to the nearest object and n to the farthest (background). The use of 16-bit values to represent object map entries allows for up to 65,536 different objects to be present in the same image. Of course, more can be accommodated with longer word sizes (e.g., 24 bits or more).

The object map is provided to the rate control circuit 440 so that quantization decisions for the current frame can be made. While the above process assumes that pixels at the same distance from the camera 100 belong to the same object, more sophisticated techniques can be utilized, such as by taking into account the spatial separation between picture areas that have the same distance (depth) from the camera.

Further, while the simple technique described herein provides a good tradeoff between accuracy and complexity, the depth map is simply an image itself, and therefore numerous classical image segmentation techniques are applicable to the present invention. Some of those techniques are discussed in R. C. Gonzalez et al., "Digital Image Processing" (Addison Wesley 1993); B. K. P. Horn, "Robot Vision" (MIT Press 1986); and W. K. Pratt, "Digital Image Processing" (Wiley Interscience 1991). Those skilled in the art may utilize such alternative techniques to perform object segmentation on the depth map.

Figure 10:
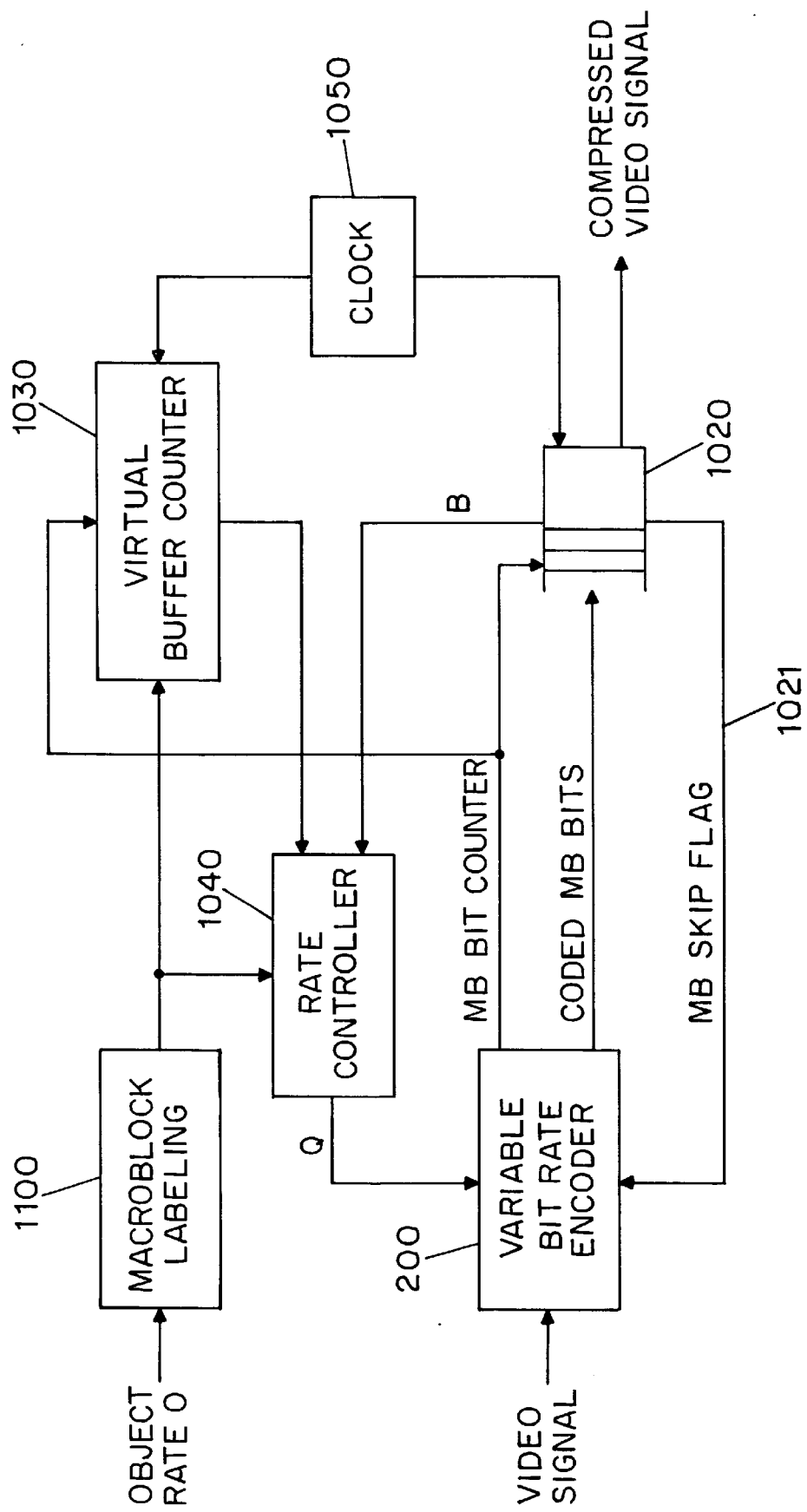
FIG. 10 is a system diagram of a constant bit rate encoder in accordance with a preferred aspect of the invention.

FIG. 10 is a system diagram of a constant bit rate encoder in accordance with a preferred aspect of the invention. The object map generated by object segmentation circuit 500 is received by macroblock labeling circuit 1100. Since the encoder 200 splits each frame of video information received from camera 100 into macroblocks and quantizes DCT coefficients on a macroblock basis, it is desirable to assign each macroblock of video data to a specific object, or in the case of the simple segmentation technique described above, to a region which contains one or more objects at the same depth from the camera 100. Thus, even if the macroblock includes pixels from more than one object or region, it will be assigned to one object or region, e.g., to the object or region which is nearest to the camera 100 and hence the most perceptually important. Once such an assignment has been made by macroblock labeling circuit 1100, the rate controller 1040 can select an appropriate quantizer step size for the entire current macroblock.

Figure 11:
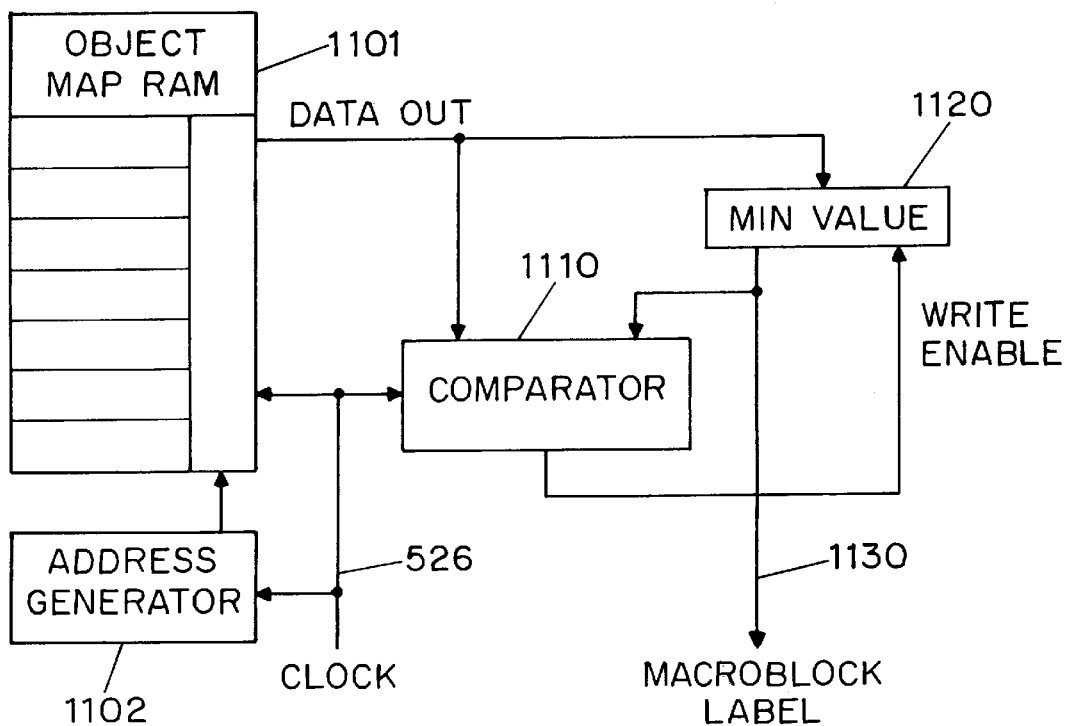
FIG. 11 shows a macroblock labeling circuit useful in the FIG. 10 encoder.

Referring to FIG. 11, the macroblock labeling circuit 1100 includes object map RAM 1101 which contains an object identifications for each pixel in the macroblock (a 16×16 array of pixels). Because the object map is constructed by assigning the lowest object identification to the nearest object, the circuit simply must search for the lowest object identification for the macroblock, i.e., the smallest number within the 16×16 array of numbers held in RAM 1101.

To accomplish this, minimum value register 1120 is set to its maximum value (sixteen 1's for sixteen bit words) at the beginning of each cycle. Comparator 1110 compares each pixel identification, retrieved from object map RAM 1101 when addresses are generated by address generator 1102, with the value stored in minimum value register 1120. If the current value is smaller than the value held in register 1120, comparator 1110 outputs a logical 1 which acts as a write enable signal to register 1120 so that the current value is stored in register 1120. If the current value is equal to or larger than the value stored in comparator 1110, no write enable signal is generated. At the end of the cycle, the minimum value register will contain the value of the lowest object identification in the macroblock. This is output to rate controller 1040 as the macroblock label 1130.

For VBR coding, the macroblock labels can be directly used for rate control by associating particular quantizer step sizes with each object. Typically, the nearest object is assigned a finer quantizer (more bits, hence higher quality), while the background (farthest object) is assigned a coarser quantizer (less bits and less quality). In this case, quantizer selection is simply a lookup operation into a table which indexes the possible object identifications generated by macroblock labeling circuit 1100. The encoder can also employ techniques to "smooth out" quantizer differences at object boundaries by gradually changing the quantization step while entering or exiting an object. An exemplary smoothing process is outlined below in connection with the CBR encoder.

For CBR coding, the rate controller 1040 must additionally regulate quantizer selection so that the output buffer 1020 neither overflows nor underflows, as explained above. Since the total number of bits per second which may by output is now fixed, object sizes become important. A technique for performing area-selective rate control when the object locations are known has been described in Eleftheriadis et al., "Automatic Face Location Detection for Model-Assisted Rate Control in H.261-Comparable Coding of Video," 7 Signal Processing: Image Communication 435–55 (1995), the disclosure of which is incorporated by reference herein.

In accordance with that technique, each object is associated with a particular target average bit rate $R_i$, i=1, ..., n−1, except for the background (object n). In order to maintain the given total average rate R necessary to prevent buffer overflow, the background rate is determined according to the formula:

$$\sum_{i=0}^{n} a_i R_i = R \quad (4)$$

where $a_i$ is the proportion (from 0.0 to 1.0) of the pixels in the frame that belong to object i. By definition, $$\sum_{i=0}^{n} a_i = 1 \quad (5)$$

While it is possible that $R_n$ is negative, this simply has the effect of assigning as coarse quantization as possible to the background, and may result in less average bits per second per object than the target bit rates $R_i$ indicate.

Figure 12:
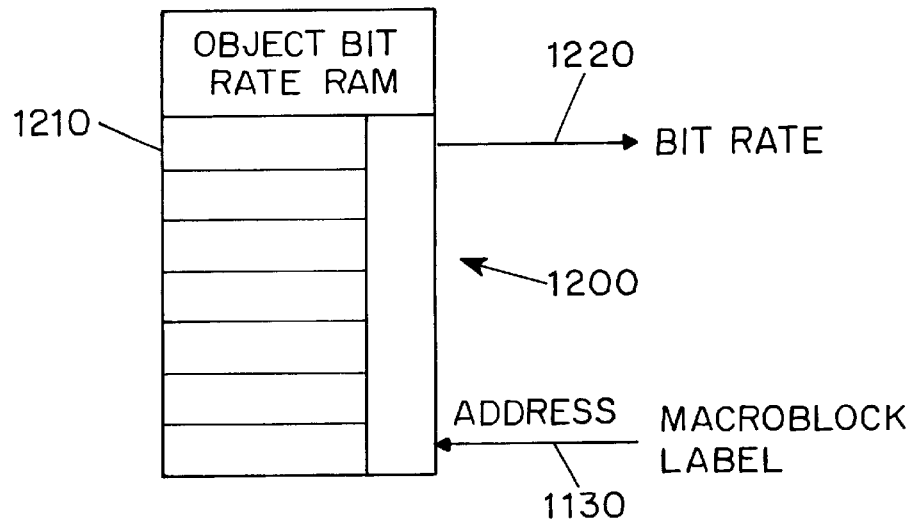
FIG. 12 shows a target bitrate generation circuit useful in the FIG. 10 encoder.

FIG. 12 shows a target bitrate generation circuit useful in the FIG. 10 encoder. The hardware of the target bitrate generation circuit 1200 may be included in the macroblock labeling circuit 1100 by coupling minimum value register 1120 (FIG. 11) to Object Bit Rate RAM 1210 so that the macroblock labels 1130 are sent to RAM 1210. RAM 1210 contains the individual desired target bit rates $R_i$. The size of RAM 1210 will depend on the number of bits available for the macroblock labels, so that for example, if 8-bit macroblock labels are used, RAM 1210 will require $2^8$ memory locations (all of the memory locations will be needed only if there are a large number of objects in the scene 110 at different depths from camera 100).

To avoid floating point calculations, the bit rates are indicated as integer values that are subsequently scaled. Each address of RAM 1210 corresponds to a particular object label, so that the macroblock labels 1130 are directly used as memory addressed for RAM 1210. Upon being accessed by a macroblock label 1130, RAM 1210 will output 1220 the corresponding target bit rate $R_i$.

Referring again to FIG. 10, the rates $R_i$ are used in a buffer regulation process that uses a technique of buffer rate and buffer size modulation. In order to realize this technique, a "virtual buffer" having an occupancy which is determined by a virtual buffer counter 1030 is added to the circuit in addition to physical buffer 1020. While the physical buffer 1020 continues to function to output compressed video data and to track overflow (so that a macroblock skip flag 1021 can be sent to encoder 200 if necessary to avoid buffer overflow), the virtual buffer is used in the quantizer selection process.

The regulation process for the physical buffer 1020 is governed by the following equations:

$$B_i = B_{i-1} + b_i - r \quad (6)$$

$$Q_i = f(B_{i-1}) \quad (7)$$

where $B_i$ is the buffer occupancy after coding macroblock i, $b_i$ is the number of bits used to code macroblock i, r is the number of bits per second per macroblock (equal to R over the number of macroblocks in a frame), and $Q_i$ is the quantizer step size selected for quantizing macroblock i. As discussed above, several forms are possible for the function f(.), one of which is given in Eq. (3).

In the embodiment shown in FIG. 10, Eq. (6) is only used to monitor the actual buffer 1020 occupancy so that macroblock skipping can be effected by sending flag 1021 to encoder 200. The quantizer selection is performed according to the virtual buffer as discussed below.

A system clock 1050 generates a system clock signal which causes buffer 1020 to output a predetermined amount of compressed video data. The clock signal is also applied to virtual buffer counter 1030 so that the counter 1030 can be incremented down by the predetermined amount. Likewise, the encoder 200 sends a macroblock bit count signal to counter 1030 whenever a macroblock of video data is encoded and passed to buffer 1020 so that the counter 1030 can be incremented up by the macroblock count. Counter 1030 also receives the target bit rate signal generated by the macroblock labeling circuit 1100 described above.

Buffer rate modulation is accomplished by manipulating the occupancy of the virtual buffer as follows. When a macroblock that has been assigned to object i is being encoded, the virtual buffer's occupancy, as determined by counter 1030, is modulated by the ratio $R_i/R$. This has the effect of increasing/decreasing the data output rate as from the perspective of the encoder, and results in appropriate quantizer modifications (finer/coarser respectively). Therefore, if a current macroblock (i) is assigned to an object k, Eq. (6) becomes $$B_i = B_{i-1} + b_i - \frac{R_k}{R} r \qquad (8)$$

where B' indicates buffer occupancy for the virtual buffer, $b_i$ is equal to the number of bits used to encode the present macroblock (as indicated by the macroblock bit count signal), r is equal to the number of bits output by the physical buffer 1020, $R_k$ is the target bit rate indicated by the target bit rate signal, and R is the average output bit rate to be maintained by the buffer 1020. Virtual buffer counter 1030 performs this calculation and provides a virtual buffer occupancy signal B' to rate controller 1040.

To assist the short-term convergence of the technique without affecting its long-term characteristics that are governed by Eq. (4), buffer size modulation is also used to smooth out quantization boundaries. The virtual buffer occupancy at object boundaries is modulated by rate controller 1040 by a factor greater/less than 1 depending on whether the encoder is entering an object region of finer/coarser quantization. The factor is stepped to 1 in a few macroblocks (i.e., its influence is faded out). This technique has the effect of immediately boosting the quantizer step size at lower/higher levels. With appropriate selection of modulation factors it is possible to achieve a smooth but fast change of quantization step sizes to the desired levels so that sharp quality differences between neighboring macroblocks are eliminated while the average bit rates $R_i$ are maintained during encoding of macroblocks associated with the objects i.

Quantizer selection is performed by rate controller 1040 according to the formula $$Q_i = f(s_{i-1} B_{i-1}) = \min\left\{ \left\lfloor \frac{B_{i-1}}{\frac{B_{\max}}{s_{i-1}}} 32 \right\rfloor + 1, 31 \right\} \qquad (9)$$

where $s_i$ is a buffer size modulation factor for macroblock i. This factor is set to 1, except when crossing a region between macroblocks assigned to objects with different quantizer step sizes. When entering a region of lower step size, the factor is set to 1.4, and then decremented while the encoder 200 processes macroblocks of the same object with a step of 0.2 until it reaches the value 1. Similarly, when entering a region of higher step size, the factor is set to 0.6, and then incremented while the encoder 200 processes macroblocks of the same object with a step of 0.2 until it reaches the value 1.

Figure 13:
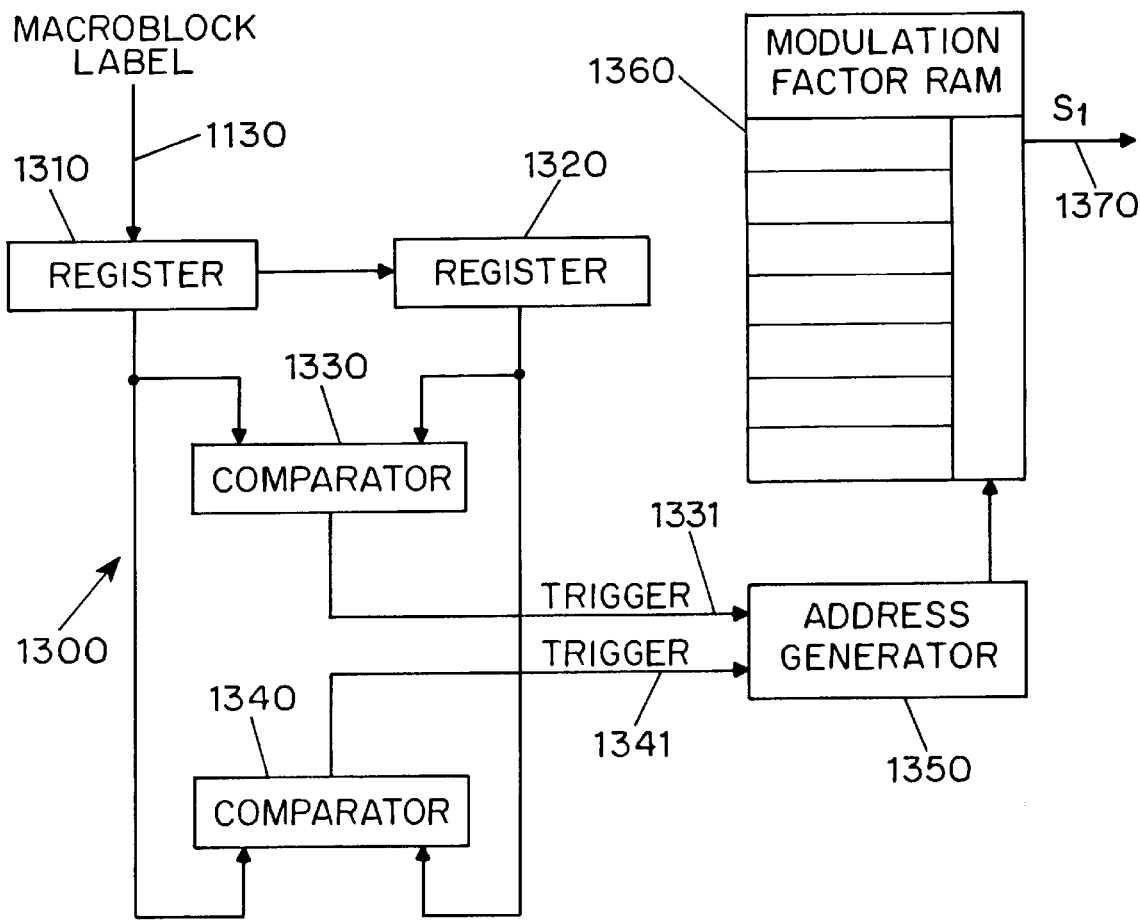
FIG. 13 shows a buffer size modulation signal generation circuit useful in the FIG. 10 encoder.

FIG. 13 shows a buffer size modulation signal generation circuit which may be included in the rate controller 1040 to generate the factors $s_i$. Macroblock labels 1130 are input into register 1310. Whenever register 1310 receives a new macroblock labels the contents of register 1310 are shifted to register 1320, and the contents of registers 1310 and 1320 are compared in comparators 1330, 1340. If the contents of register 1310 is greater than the contents of register 1320, comparator 1330 outputs a "1"; otherwise comparator 1330 outputs a 0. If the contents of register 1310 is smaller than the contents of register 1320, comparator 1340 outputs a "1"; otherwise comparator 1330 outputs a 0. If registers 1310, 1320 have equal values, comparators 1330, 1340 output a 0.

The outputs of the comparators 1330 and 1340 are used as triggers for address generator 1350, which generates an address in modulation factor RAM 1360 that, in turn, contains the buffer size modulation factors $s_i$. As with Object Bit Rate RAM 1210, the contents of RAM 1360 are preferably integer values which are subsequently scaled by 128 in the quantizer selection portion of the rate controller 1040, in order to avoid fractional or floating point calculations. The buffer size modulation signal generation circuit 1300 is driven by the common system clock (not shown).

The address generator operates under the following state transition table:

TABLE 1

| T 1331 | T 1341 | Old State | New State | $s_i$ |
|---|---|---|---|---|
| 0 | 0 | 0 | 0 | 1.0 |
| 0 | 0 | 1 | 2 | 1.4 |
| 0 | 0 | 2 | 3 | 1.2 |
| 0 | 0 | 3 | 0 | 1.0 |
| 0 | 0 | 4 | 5 | 0.6 |
| 0 | 0 | 5 | 6 | 0.8 |
| 0 | 0 | 6 | 0 | 1.0 |
| 0 | 1 | X | 4 | 0.6 |
| 1 | 0 | X | 1 | 1.4 |

As shown in Table 1, when comparator 1330 outputs a 0 so that the value of trigger 1331 is a 0 and comparator 1340 outputs a 1 so that the value of trigger 1341 is a 1, the encoder 200 is compressing a macroblock of data that corresponds to a region in scene 110 that is closer to camera 100, and more bits will be allocated to that macroblock of data due to a higher target bit rate R value, as discussed above. In order to avoid an jump in quantization granularity, the address generator generates address value 4 which corresponds to $s_i$=0.6. In the next clock cycles, if the encoder 200 continues to compress macroblocks that belong to the same object, triggers 1331 and 1341 will both have the value 0 and the address generator will move from address 4 to address 5 to address 6 to address 0, as shown in Table 1, and the value of $s_i$ will be faded out by increasing from 0.6 to 0.8 to 1.0.

Likewise, if when comparator 1330 outputs a 1 so that the value of trigger 1331 is a 1 and comparator 1340 outputs a 0 so that the value of trigger 1341 is a 0, the encoder 200 is compressing a macroblock of data that corresponds to a region in scene 110 that is farther to camera 100, and less bits will be allocated to that macroblock of data due to a lower target bit rate R value. In such circumstances, the address generator generates address value 1 which corresponds to $s_i$=1.4. In the next clock cycles, if the encoder 200 continues to compress macroblocks that belong to the same object, triggers 1331 and 1341 will both have the value 0 and the address generator will move from address 1 to address 2 to address 3 to address 0, as shown in Table 1, and the value of $s_i$ will be faded out by decreasing from 1.4 to 1.2 to 1.0.

While the circuit described with reference to FIG. 13 assumes that macroblocks corresponding to objects closer to the camera 100 are assigned higher target bit rates R, other bit rate allocation schemes could be employed. A different state transition table could be employed under such circumstances. Alternatively, the architecture of circuit 1300 could be modified so that comparators 1330, 1330 compare the actual bit rate values assigned to the objects rather than the macroblock labels themselves. Such a modification could directly employ Object Bit Rate Ram 1210 by accessing the RAM 1210 on two successive clock cycles by the individual object labels, with the two outputs fed into comparators 1330, 1340 directly.

Referring again to FIG. 11, the factors $s_i$ are provided via a line 1370 so that rate controller 1040 can calculate Eq. 9 and generate appropriate quantization selection signals Q. As will be appreciated by those skilled in the art, the calculation of Eq. 9 may be performed by a simple software routine run on a RAM (not shown) in rate controller 1040, or by appropriate micro-coded hardware. In this manner, the rate control circuit 1040 generates a quantization selection signal Q which is applied to the encoder 200 to select an appropriate quantization mode which is reflective of the perceptual importance of the object from which video data is presently being encoded in the encoder 200. The encoder 200 accordingly processes each macroblock in a frame in a left-to-right, top-to-bottom manner (except in the case of H.261, where the GOB structure must be followed), using the quantizer step size provided by the rate control circuit 1040.

While the foregoing has been directed to the use of depth information in field or frame based encoding techniques such as MPEG-2, the present invention has equal applicability to object-based video compression techniques such as MPEG-4. Although MPEG-4 is not unique in this capability, an embodiment of the present invention suitable for use in an MPEG-4 scheme is given to illustrate an application of the invention in an otherwise well-known object-based compression technique. As the MPEG-4 standard is subject to further modification as of the time of writing this specification, the discussion herein is based on the most recent version of the codec design, Verification Model 3.0.

Figure 14:
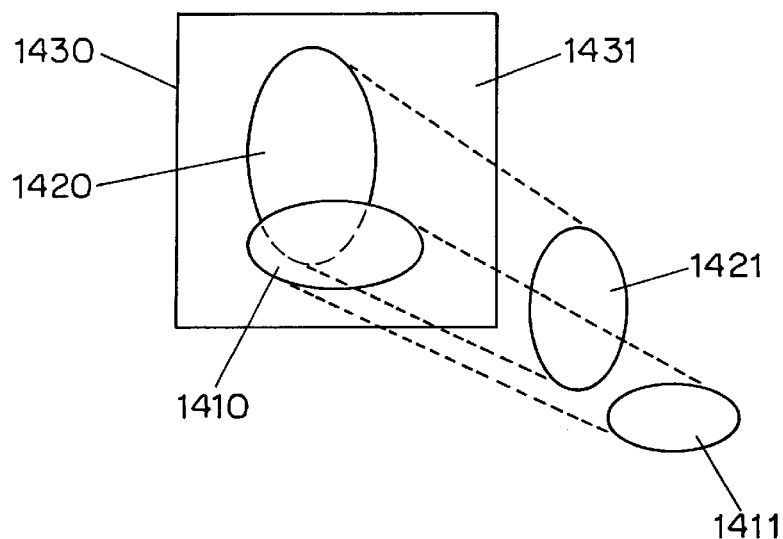
FIG. 14 is a schematic diagram of video objects and video object planes within a frame of video information.

The basic structure of MPEG-4 is similar to ITU H.263, except for the notion of a Video Object (VO) and a Video Object Plane (VOP). As illustrated in FIG. 14, VOs are independent objects 1410, 1420, 1430 that may exist in a scene, while VOPs are two dimensional images of arbitrary shape 1411, 1421, 1431. A frame is composed by overlaying VOPs; a sequence is composed of VOs that themselves consist of one VOP per frame.

VO compression is performed individually for each object. Since the VOPs of a VO have an arbitrary shape, both texture and shape compression must be utilized. Shape compression encodes the contour that defines the border of the VOP. Several well known techniques for shape coding, including chain coding, may be utilized.

With respect to texture coding, the techniques are almost identical to the ones used in the ITU H.263 specification, which in turn is similar to MPEG-2, with specific modifications for low bit rate applications. The codec operates on a macroblock mode, using the familiar motion-compensated DCT structure discussed above. In cases where the shape contour intersects a macroblock, the macroblock is "padded" by inserting filler pixel values at macroblock locations outside the shape contour to improve compression. Padded pixels are discarded at the receiver prior to display, according to the shape information that is simultaneously transmitted.

Figure 15:
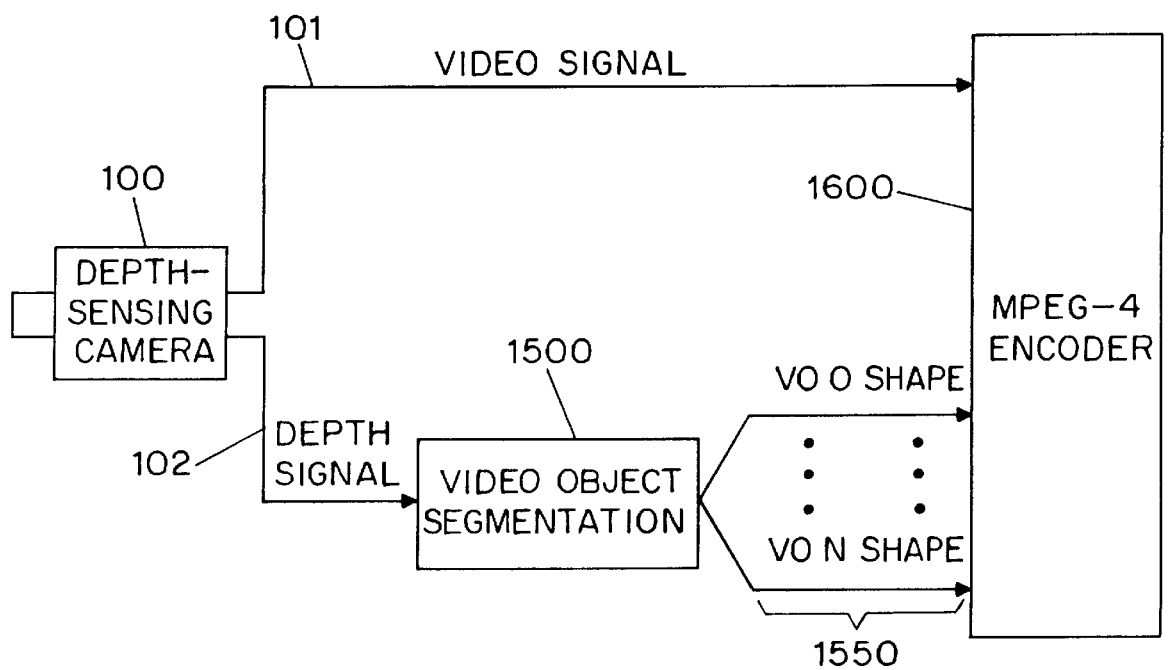
FIG. 15 is a system diagram of an object-based encoder in accordance with the invention.

The architecture of an object-based encoder utilizing a depth-sensing camera in accordance with the present invention is shown in FIG. 15. The depth-sensing camera 100 provides a standard digital video or image signal 101 to MPEG-4 encoder 1600, and a second 102 consisting of depth information for the pixels contained in the normal video signal 101 to a video object segmentation circuit 1500. Video object segmentation circuit 1500 uses the depth information to robustly separate visual objects ("VOs"), and provides video object shape information to the MPEG-4 encoder 1600 which encodes them separately. Several VOs are multiplexed 1550 in the same bitstream to form the complete picture.

Figure 16:
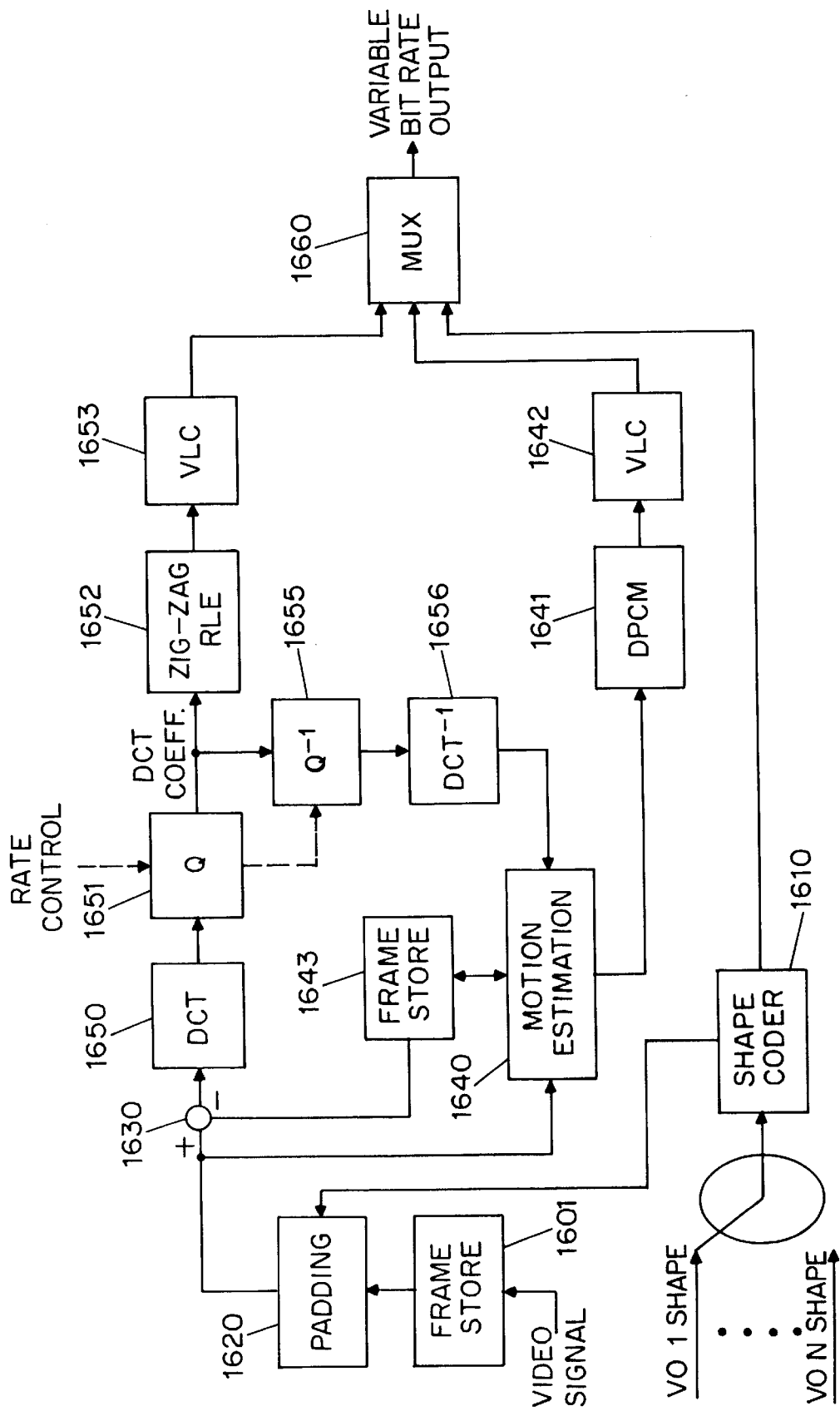
FIG. 16 is a system diagram of a typical MPEG-4 Encoder.

Referring to FIG. 16, an MPEG-4 encoder is shown. The video object shape information generated by video object segmentation circuit 1500 is provided to a shape coder 1610, while the standard digital video or image signal 101 is received and stored in a frame store 1601. The shape coder extends the current VOP bounding rectangle (i.e., the smallest rectangle that contains the entire VOP) at its bottom right side so as both its height and width are multiples of 16, to guarantee that the bounding rectangle contains an integer value of macroblocks. The individual macroblocks within the VOP are then processed with a modified MMR technique. of course, the coded information does not represent actual pixel values but rather whether or not a given pixel belongs to the current VOP or not.

The coded VOP shape information is provided to padding circuit 1620. Padding circuit 1620 retrieves the pixels from the stored standard digital image in 1601 that are identified by the coded VOP shape information, and performs a padding operation on those pixels by linearly interpolating pixels within a macroblock that are outside the VOP shape. The padding operation has the effect of improving coding performance by generating entire macroblocks for VOP's, which are more readily handled in a DCT compression technique.

Padded macroblocks for the VOPs are input to macroblock separator/adder 1630 and to motion estimation circuit 1640. A discrete cosign transform ("DCT") 1650 is applied to macroblock data from 1630. To achieve greater compression efficiency, DCT coefficients are then quantized 1651, Zig-Zag run-length encoded 1652 and variable length coded 1653. Quantized DCT coefficients are also inverse quantized 1655 and inverse discrete cosign transformed 1656 to provide past video data to the motion estimation circuit 1640 concurrently with present video data. The motion estimation circuit 1640 uses the past and present video data, which may be stored in frame store 1641, to generate motion vectors which are encoded 1641, 1642 and multiplexed 1660 with the compressed DCT coefficients.

In contrast with the segmentation process described with reference to FIG. 4, object-based compression requires not only the identification of areas of potential perceptual importance, but rather the identification of individual object areas. In the approach described with reference to FIG. 4, all objects that were within the same range from the camera were treated identically by object segmentation circuit 500, as that technique only affected rate control. Described below is an augmentation to that technique to include identification of individual objects.

Figure 17:
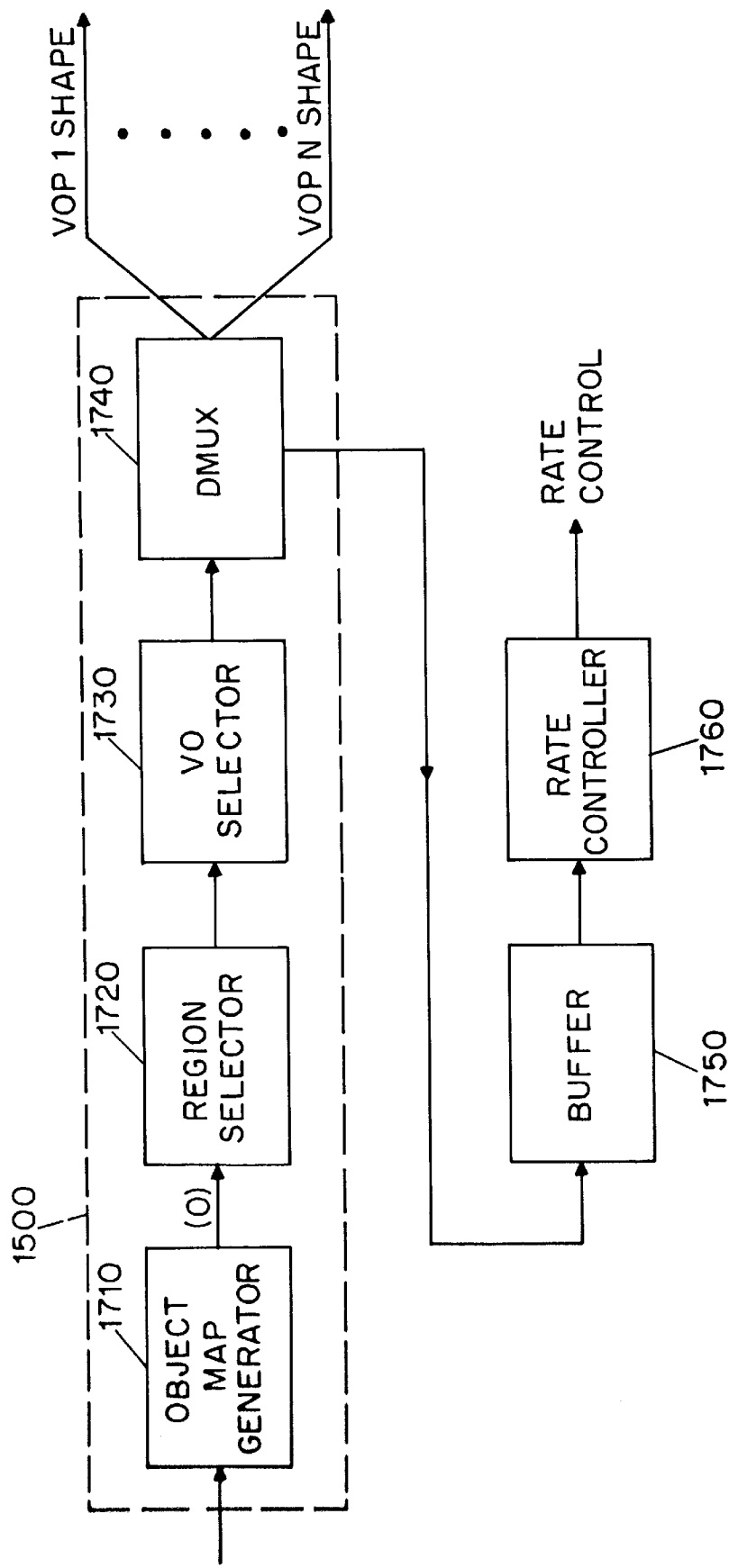
FIG. 17 shows a video object segmentation circuit useful in the FIG. 15 encoder.

Referring to FIG. 17, video object segmentation circuit 1500 is shown in greater detail. The circuit includes object map generation circuit 1710, region selector 1720, video object selector 1730, and demultiplexer 1740. The object map generation circuit 1710 generates an object map in the same manner as object segmentation circuit 500, and the hardware described with respect to that circuit is appropriate for use as the object map generation circuit 1710.

Region selector 1720 preprocesses the object map to identify which pixels are within each depth range (the area within range thresholds $t_i$ and $t_{i+1}$). These pixels are marked with 1s, whereas the remaining ones are marked with 0s. This is called a depth region mask. Video object selector 1730, which may simply be a RAM preloaded with appropriate software, then proceeds to identify the one or more video objects that exist within that region. The VOP shape information for each video object located by video object selector 1730 is passed through DMUX 1740 and provided to the shape coder 1610. The process steps taken by video object selector 1730 are described below.

Referring again to FIG. 16, for VBR encoding, there is no output buffer and VOs can be independently assigned default quantizer levels in quantizer 1651. However, for CBR encoding, quantizer selection again becomes important as a means to regulate the generated bit rate.

As shown in FIG. 17, VOP shape information is also routed to a buffer 1750 and rate controller 1760 to effectuate rate control. The rate controller 1760 generates a quantization mode selection signal in the same manner as previously described with reference to FIG. 10, except that no macroblock labeling need occur: data from the same video object is always assigned the same target bit rate B. The video object identification is used directly instead of the macroblock label in FIGS. 12 and 13 to generate the target bit rate signal used in a virtual buffer counter (not shown in FIG. 17) and the buffer size modulation factor s. The quantization mode selection signal generated by rate controller 1760 may be applied to quantizer 1651 to ensure that the physical buffer (not shown in FIG. 16) does not overflow.

Figure 18:
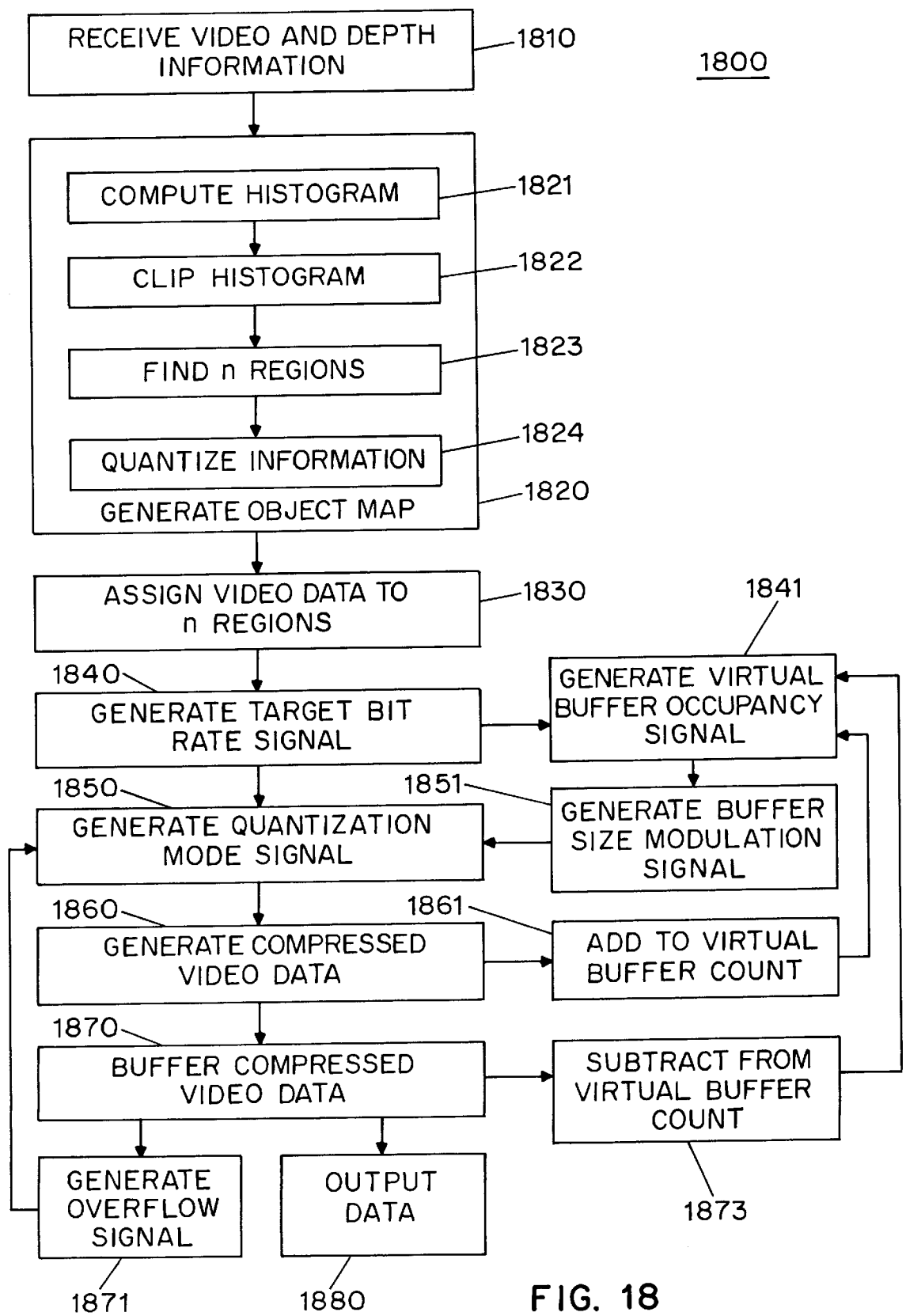
FIG. 18 is a flow chart of a method of encoding video information including the preferred steps for performing rate control in accordance with an aspect of the invention.

Referring to FIG. 18, a flow chart describing the rate control steps performed in accordance with the present invention are now described. Upon receiving video and depth information 1810, an object map is generated 1820 by computing a histogram 1821 of the received depth information to provide the number of pixels which have a predetermined depth value for a range of predetermined values, setting all values in the histogram which are below a predetermined threshold value t to zero in order to generate a clipped histogram 1822, scanning the clipped histogram 1823 to find boundaries of n regions with n different threshold depth values, and quantizing the depth information based on said n different threshold values.

Next, a current macroblock of video data is assigned 1830 to one of the regions of varying perceptual importance, and a signal indicative of a target bit rate associated with the assigned region is generated 1840. The target bit rate is used to generate a virtual buffer occupancy signal 1841 which, in turn, is used to generate a buffer size modulation signal 1851 whenever the assigned region is different from an immediately proceeding assigned region. A quantization mode signal is generated 1850 based on the object map and buffer size modulation signal to select a quantization mode reflective of the perceptual importance of the regions in the object map.

Finally, a compressed video signal is generated 1860, buffered 1870, and output 1880. If the buffer is filled, a signal indicative of a buffering overflow condition is generated 1871 and applied to step 1850. The virtual buffer count is increased 1861 whenever compressed video signal information is buffered; and decreased 1871 whenever buffered compressed video signal information is output.

Figure 19A:
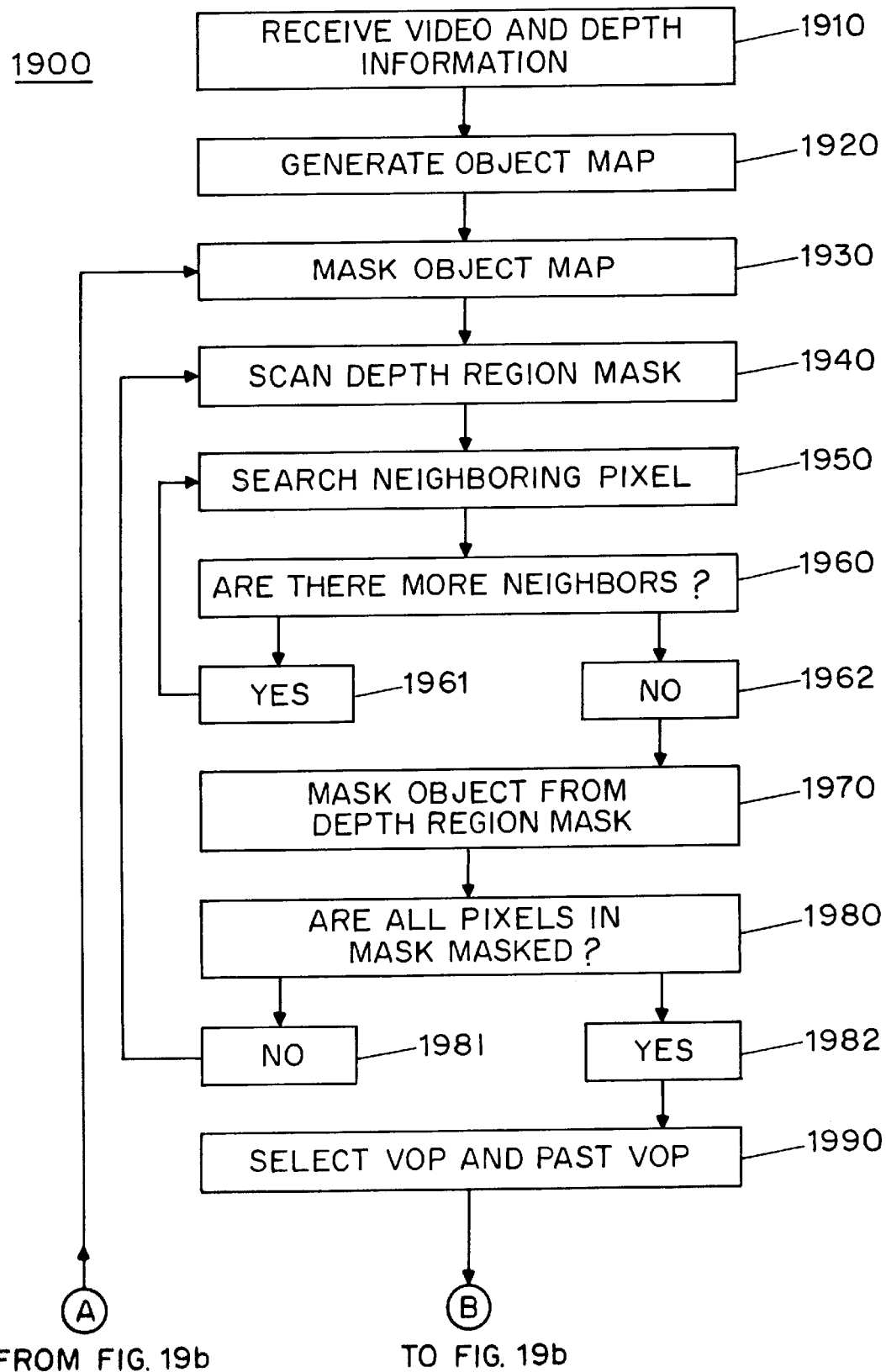
FIGS. 19a and 19b are flow charts of a method of encoding video information including the preferred steps for performing video object separation in accordance with an aspect of the invention.
Figure 19B:
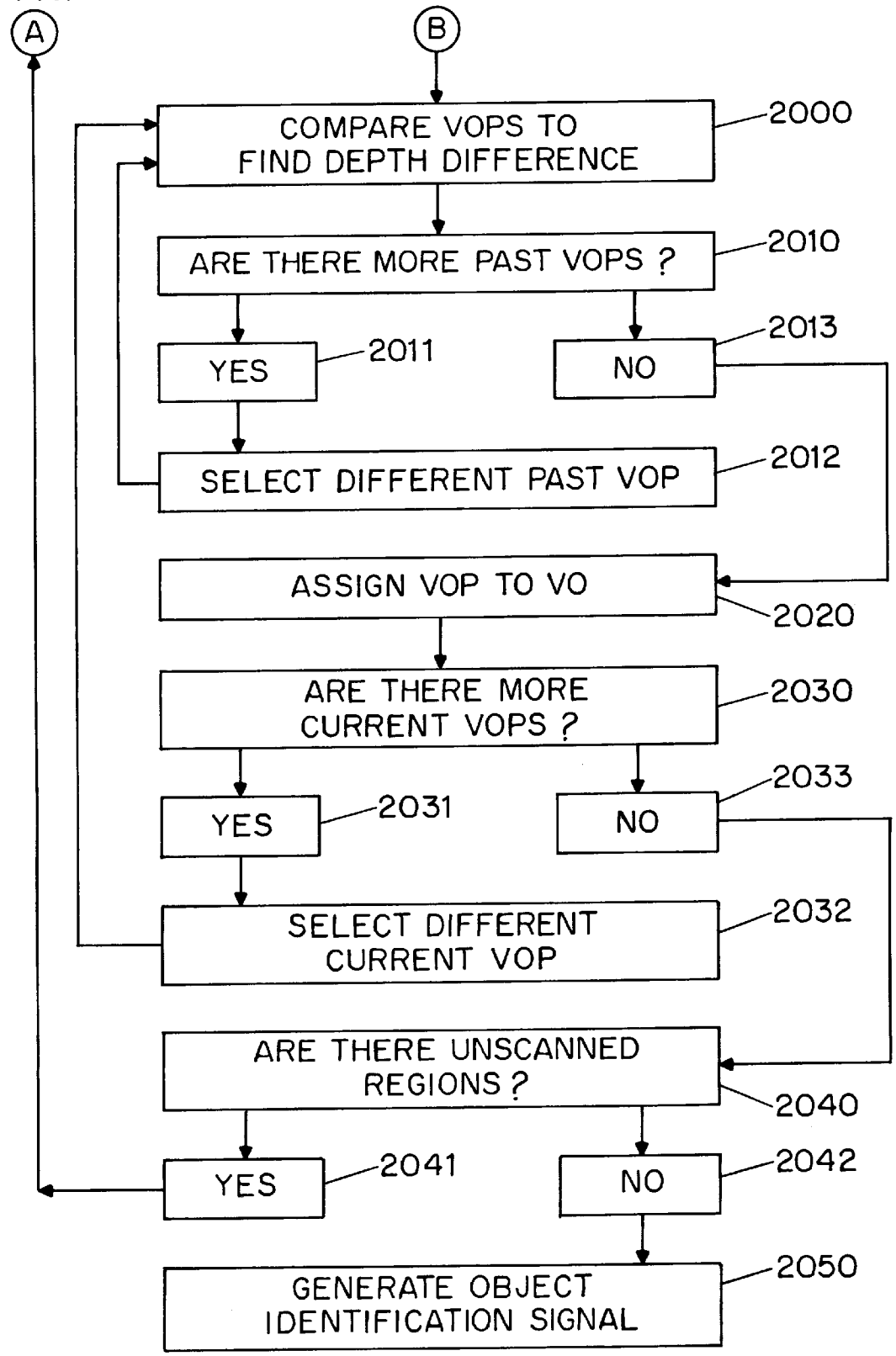

Referring to FIG. 19, a flow chart describing the steps performed video object segmentation circuit 1500 are now described. Upon receiving video and depth information 1910, an object map is generated 1920 as described with reference to FIG. 18. The object map is preprocessed to generate an object mask 1920. One or more video objects that within the masked region are then identified as follows.

Starting from the upper left corner, the region mask is scanned 1940 left to right, top to bottom until a pixel with a value "1" is found. That pixel's location in the object mask is marked.

The neighborhood of that pixel is then searched 1950 (up-down, left-right, as well as diagonally) in the region mask to see if another "1" pixel exists 1960. If a neighboring "1" pixel exists, it's location in the object mask is also marked. If there are more neighboring pixels that have not been searched, the process is repeated 1961 (previously visited pixels are ignored). If there are no unsearched neighbors 1962, the algorithm terminates, and the object mask will contain a connected object region that contained the original starting pixel. This object mask is the shape information for this particular object that is provided to the encoder 1600.

Next, the pixels in the region mask that belong to the newly created object mask are themselves masked out 1970 (i.e., by setting their values to "0"), and the process is repeated 1980, 1981. If more that one objects exist in the same depth region, there will still be marked pixels left that will be identified as one or more additional objects. After all objects are processed this way, the region mask will be left with only zero valued pixels 1980, 1982.

Each object mask is labeled with a different number which, together with the depth range ID, uniquely identify an object. For example, two bytes can be used, with the first identifying the depth range, and the second identifying the object number within that range. Longer codes can be used to accommodate more ranges or objects per range. The benefit of using a hierarchical object ID is to easily identify which objects are in the foreground and which ones are in the background.

In order to take into account a temporal component, VOPs are tracked from one frame to the next, and a decision is made as to whether they belong to the same VO by considering both the shape difference from one frame to the next, and the depth range difference from one frame to the next. VOPs that have small shape and depth difference are considered to be part of the same VO. Although the encoder may operate at a low frame rate to minimize bandwidth requirements, the object detection subsystem can operate at the full 30 frames per second rate so that objects are adequately tracked.

Referring again to FIG. 19, one of the VOPs from the present frame is selected, as is one of the stored VOPs from the immediately proceeding frame 1990. The shape difference between the two VOPs is computed 2000 as the sum of the absolute values of the differences of the coordinates of the border pixels of the current VOP with their nearest pixels from the VOP from the previous frame. By summing up the differences in both horizontal and vertical directions, as well as the absolute value of the depth difference, an estimate of the dissimilarity between two VOPs is generated.

If there are more VOPs for the immediately proceeding frame 2010, 2011, a different past VOP is selected 2012, and the shape difference between the two VOPs is computed. When there are no more past frame VOPs 2010, 2013, the current VOP is assigned 2020 to the VO that provides the closest VOP in the previous frame. If there is no VOP in the previous frame, then a new VO is created.

If additional current VOPs exist 2030, 2031, the process is repeated by selecting a new current VOP 2032 and repeating steps 2000–2030. When all VOPs in the mask are assigned to a video object, a new mask may be generated 2040, 2041, and the process steps 1930–2030 are repeated. When all video objects have been identified 2040, 2042, the object identification signals are generated 2050 and sent to DMUX 1740 (FIG. 17).

The foregoing merely illustrates the principles of the invention. Various modifications and alterations to the described embodiments will be apparent to those skilled in the art in view of applicants' teachings, herein. For example, while the video object information generated in the embodiment shown in FIG. 15 is two-dimensional, it is also possible to encode the 3-D depth information generated by camera 100 directly and send it to the decoder. Such encoding would allow object manipulations such as rotations and custom lighting to be performed even after compression.

Further, more sophisticated rate control techniques can also be employed. For example, the system can try to identify the semantics of the different objects (e.g., human faces, sheets of paper, etc.) and automatically assign appropriate bit rates or quality levels to them. The semantics can either be obtained from the 2-D shape information, or from the 3-D depth information provided by the depth-sensing camera. It will thus be appreciated that those skilled in the art will be able to devise numerous systems and methods which, although not explicitly shown or described herein, embody the principles of the invention and are thus within the spirit and scope of the invention.

We claim:

1. An apparatus for encoding fields or frames of video information comprising a two dimensional array of pixels, and using a depth component of each of said pixels to enhance encoding, comprising:

(a) an encoder for receiving frames or fields of video information and generating a compressed video signal from said received frames or fields of video information, said encoder including a multi-mode quantizer for quantizing data which corresponds to a portion of said fields or frames of video information;

(b) an object segmentation circuit for receiving depth information which corresponds to said received video information and generating an object map to associate each pixel of said received field or frame with one of one or more regions of varying perceptual importance within said received frame or field; and (c) a rate controller, coupled to said object segmentation circuit and to said multi-mode quantizer, for receiving said object map and for providing a signal, responsive to said object map, to said multi-mode quantizer to select a quantization mode therein, such that said selected quantization mode is reflective of said perceptual importance of said regions indicated by said object map.

2. The apparatus of claim 1, wherein said encoder is a variable bit rate encoder capable of generating an MPEG-2 compliant bit stream.

3. The apparatus of claim 1, wherein said object segmentation circuit comprises:

(1) a histogram generation circuit for receiving said depth information and for computing a histogram of said depth information to thereby provide the number of pixels which have a predetermined depth value for a range of predetermined values;

(2) a first logic circuit, coupled to said histogram generation circuit, for receiving said generated histogram and for setting all values in said histogram which are below a predetermined threshold value to zero to thereby generate a clipped histogram;

(3) a second logic circuit, coupled to said first logic circuit, for receiving said clipped histogram and for scanning said clipped histogram to find boundaries of n regions with n different threshold depth values; and (4) a variable step quantization circuit, coupled to said second logic circuit, for receiving said n different threshold values and said depth information, and for quantizing said depth information based on said n different threshold values, to thereby generate said object map.

4. The apparatus of claim 3, wherein said histogram generation circuit comprises:

(i) a buffer for receiving and temporarily storing said depth information;

(ii) a memory, coupled to said buffer, for receiving said depth information from said buffer as memory addresses and for storing histogram values as said memory addresses; and (iii) a logic circuit, coupled to said memory, for reading a histogram value from said memory at an address location, updating said histogram value, and providing said updated histogram value to said memory at said address location.

5. The apparatus of claim 1, wherein said encoder is a variable bit rate encoder, and further comprising:

(d) a video buffer having a preselected storage capacity, coupled to said encoder and to said rate controller, for receiving and temporarily storing said generated compressed video signal, and for providing a signal indicative of an overflow condition to said rate controller, wherein said signal provided by said rate controller to said multi-mode quantizer is also responsive to said overflow signal such that said selected quantization mode is reflective of said perceptual importance of said regions as constrained by said storage capacity of said video buffer.

6. The apparatus of claim 5, further comprising:

(e) a macroblock labeling circuit, coupled to said object segmentation circuit and to said rate controller, for assigning a current macroblock of video data to one of said regions of varying perceptual importance and for providing a signal indicative of said assigned region to said rate controller, wherein said signal provided by said rate controller to said multi-mode quantizer is reflective of said assigned region.

7. The apparatus of claim 6, wherein said current macroblock of video data is assigned to a region having the greatest perceptual importance of one or more regions identified by a location of said object map which corresponds to said macroblock of video data.

8. The apparatus of claim 6, wherein said encoder generates an output signal when compressed video data is output to said video buffer, and wherein said macroblock labeling circuit generates a signal indicative of a target bit rate associated with said assigned region, further comprising:

(f) a clock signal generating circuit, coupled to said video buffer, for providing a clock signal to said buffer, wherein said video buffer outputs a predetermined amount of said compressed video signal in response to said clock signal; and (g) a counter, coupled to said encoder, to said clock signal generating circuit, to said macroblock labeling circuit and to said rate controller, for receiving said clock signal, said target bit rate signal and said encoder output signal, for counting the number of bits that are in a virtual buffer associated with said video buffer by adding to said count in response to said encoder output signal and subtracting from said count in response to said clock signal and to said target bit rate signal to thereby determine an occupancy of said virtual buffer, and for providing a virtual buffer occupancy signal indicative of said count to said rate controller;

wherein said signal provided by said rate controller to said multi-mode quantizer is also responsive to said virtual buffer occupancy signal such that said selected quantization mode is reflective of said perceptual importance of said regions indicated by said virtual buffer capacity as constrained by said storage capacity of said video buffer.

9. The apparatus of claim 8, wherein said virtual buffer occupancy $B_i$ is determined by the equation $B_i = B_{i-1} + b_i - r(R_k/R)$, where $b_i$ is equal to the number of bits used to encode the present macroblock indicated by said encoder output signal, r is equal to the number of bits output by said video buffer indicated by said clock signal, $R_k$ is the target bit rate indicated by said target bit rate signal, and R is the average output bit rate to be maintained by said video buffer.

10. The apparatus of claim 8, wherein said rate controller further comprises a buffer size logic circuit, coupled to said macroblock labeling circuit, for receiving said assigned region and for generating a buffer size modulation signal whenever said assigned region is different from an immediately proceeding assigned region, wherein said signal provided by said rate controller to said multi-mode quantizer is also responsive to said buffer size modulation signal such that said selected quantization mode is reflective of said perceptual importance of said regions indicated by said virtual buffer capacity as modulated by said buffer size modulation signal and as constrained by said storage capacity of said video buffer.

11. An apparatus for encoding fields or frames of video information comprising a two dimensional array of pixels, and using a depth component of each of said pixels to enhance encoding, comprising:

(a) a depth sensing camera capable of generating in real-time both frames or fields of video information and depth information which corresponds to said video information;

(b) an encoder, coupled to said depth sensing camera and receiving said generated frames or fields of video information, for generating a compressed video signal from said frames or fields of video information, said encoder including a multi-mode quantizer for quantizing data which corresponds to a portion of said fields or frames of video information;

(c) an object segmentation circuit, coupled to said depth sensing camera and receiving said generated depth information, for generating an object map to associate each pixel of said received field or frame with one of one or more regions of varying perceptual importance within said received frame or field; and (d) a rate controller, coupled to said object segmentation circuit and to said multi-mode quantizer, for receiving said object map and for providing a signal, responsive to said object map, to said multi-mode quantizer to select a quantization mode therein, such that said selected quantization mode is reflective of said perceptual importance of said regions indicated by said object map.

12. A method for encoding fields or frames of video information comprising a two dimensional array of pixels using a depth component of each of said pixels to enhance encoding, comprising the steps of:

(a) receiving frames or fields of video information and depth information which corresponds to said received video information;

(b) converting said received three information into an object map to thereby associate each pixel of said received field or frame with one of one or more regions of varying perceptual importance within said received frame or field;

(c) generating a quantization mode signal based on said object map to select a quantization mode reflective of said perceptual importance of said regions indicated by said object map; and (d) generating a compressed video signal which corresponds to said received frames or fields of video information by quantizing data which corresponds to a portion of said received fields or frames of video information in accordance with said quantization mode selected by said quantization mode signal.

13. The method of claim 12, wherein said compressed video signal generated in step (d) is an MPEG-2 compliant bit stream.

14. The method of claim 12, wherein said converting step comprises:

(1) computing a histogram of said received depth information to thereby provide the number of pixels which have a predetermined depth value for a range of predetermined values;

(2) setting all values in said histogram which are below a predetermined threshold value to zero to thereby generate a clipped histogram;

(3) scanning said clipped histogram to find boundaries of n regions with n different threshold depth values; and (4) quantizing said depth information based on said n different threshold values.

15. The method of claim 12, wherein said generated compressed video signal is a variable bit rate signal, and further comprising the steps of:

(e) buffering said generated compressed video signal; and (f) providing a signal indicative of a buffering overflow condition, wherein said quantization mode signal is also responsive to said overflow signal such that said selected quantization mode is reflective of said perceptual importance of said regions as constrained by a buffering limitation.

16. The method of claim 15, further comprising the step of assigning, prior to generating said quantization mode signal, a current macroblock of video data within said received frames or fields of video information to one of said regions of varying perceptual importance, wherein said quantization mode signal is reflective of said assigned region.

17. The method of claim 16, wherein said assigning step further comprises assigning said current macroblock of video data to an region having the greatest perceptual importance of one or more regions identified by a location of said object map which corresponds to said macroblock of video data.

18. The method of claim 16, further comprising the step of generating a signal indicative of a target bit rate associated with said assigned region prior to generating said quantization mode signal.

19. The method of claim 18, further comprising the steps of:
   (i) adding to a virtual buffer count indicative of a virtual buffer occupancy whenever compressed video signal information is buffered;
   (ii) subtracting from said count whenever buffered compressed video signal information is output in an amount which dependant on said target bit rate signal; and
   (iii) generating a virtual buffer occupancy signal indicative of said count, wherein said quantization mode signal is also responsive to said virtual buffer occupancy signal such that said selected quantization mode is reflective of said perceptual importance of said regions indicated by said virtual buffer occupancy as constrained by said buffering limitation.

20. The method of claim 19, wherein said virtual buffer occupancy $B_i$ is determined by the equation $B_i = B_{i-1} + b_i - r(R_k/R)$, where $b_i$ is equal to the number of bits used to encode the present macroblock indicated by said encoder output signal, r is equal to the number of bits output by said video buffer indicated by said clock signal, $R_k$ is the target bit rate indicated by said target bit rate signal, and R is the average output bit rate required to prevent said buffering limitation from occurring.

21. The method of claim 16, further comprising the step of generating, prior to generating said quantization mode signal, a buffer size modulation signal whenever said assigned region is different from an immediately proceeding assigned region, wherein said quantization mode signal is also responsive to said buffer size modulation signal such that said selected quantization mode is reflective of said perceptual importance of said regions indicated by said virtual buffer capacity as modulated by said buffer size modulation signal and as constrained by said buffering limitation.

22. An apparatus for performing object-based encoding of video information using a depth component of said video information to enhance encoding, comprising:
   (a) an object segmentation circuit for receiving depth information for a frame of video information and generating one or more object identification signals based on said received depth information indicative of a shape of one or more objects within said frame of video information; and
   (b) an encoder, coupled to said object segmentation circuit, for receiving the frame of video information which corresponds to said received depth information and said one or more object identification signals, and for encoding a video signal representing only a portion of said video information, which portion substantially corresponds to said one or more objects identified by said one or more object identification signals.

23. The apparatus of claim 22, wherein said object segmentation circuit comprises:
   (1) a object map generation circuit for receiving said depth information and for converting said depth information into an object map to thereby associate each pixel within said frame of video information with one of one or more regions of varying perceptual importance within said frame;
   (2) a region masking circuit, coupled to said object map generation circuit and receiving said object map, for masking said object map to generate a depth region mask indicative of pixels within said frame which substantially correspond to a preselected region; and
   (3) a video object selection circuit, coupled to said region masking circuit and receiving said generated region mask, for identifying one or more separate objects within said preselected region indicated by said region mask and generating said one or more object identification signals, such that each one of said object identification signals identifies one of said one or more identified separate objects.

24. The apparatus of claim 23, wherein said object map generation circuit comprises:
   (i) a histogram generation circuit for receiving said depth information and for computing a histogram of said depth information to thereby provide the number of pixels which have a predetermined depth value for a range of predetermined values;
   (ii) a first logic circuit, coupled to said histogram generation circuit, for receiving said generated histogram and for setting all values in said histogram which are below a predetermined threshold value to zero to thereby generate a clipped histogram;
   (iii) a second logic circuit, coupled to said first logic circuit, for receiving said clipped histogram and for scanning said clipped histogram to find boundaries of n regions with n different threshold depth values; and
   (iv) a variable step quantization circuit, coupled to said second logic circuit, for receiving said n different threshold values and said depth information, and for quantizing said depth information based on said n different threshold values, to thereby generate said object map.

25. The apparatus of claim 24, wherein said histogram generation circuit comprises:
   (A) a buffer for receiving and temporarily storing said depth information;
   (B) a memory, coupled to said buffer, for receiving said depth information from said buffer as memory addresses and for storing histogram values as said memory addresses; and
   (C) a logic circuit, coupled to said memory, for reading a histogram value from said memory at an address location, updating said histogram value, and providing said updated histogram value to said memory at said address location.

26. The apparatus of claim 22, wherein said encoder includes a multi-mode quantizer for quantizing data which corresponds to a portion of said received fields of video information, further comprising:
   (c) a rate controller, coupled to said an object segmentation circuit and to said multi-mode quantizer, for receiving said one or more object identification signals and for providing a signal, responsive to said object identification signals, to said multi-mode quantizer to select a quantization mode therein, such that for each portion of data to be quantized, said selected quantization mode is reflective of a perceptual importance of an object identified by one of said one or more object identification signals which is associated with said portion of data to be quantized.

27. The apparatus of claim 26, wherein said encoder is a variable bit rate encoder, and further comprising:
   (d) a video buffer having a preselected storage capacity, coupled to said encoder and to said rate controller, for receiving and temporarily storing said generated compressed video signal, and for providing a signal indicative of an overflow condition to said rate controller, wherein said signal provided by said rate controller to said multi-mode quantizer is also responsive to said overflow signal such that said selected quantization mode is reflective of said perceptual importance of said object as constrained by said storage capacity of said video buffer.

28. The apparatus of claim 27, wherein said portion of data to be quantized is a macroblock, further comprising:

(e) a macroblock labeling circuit, coupled to said object segmentation circuit and to said rate controller, for assigning a current macroblock of video data to one of said objects and for providing a signal indicative of said assigned object to said rate controller, wherein said signal provided by said rate controller to said multi-mode quantizer is reflective of said assigned object.

29. The apparatus of claim 28, wherein said encoder generates an output signal when compressed video data is output to said video buffer, and wherein said macroblock labeling circuit generates a signal indicative of a target bit rate associated with said assigned object, further comprising:

(f) a clock signal generating circuit, coupled to said video buffer and providing a clock signal to said buffer, wherein said video buffer outputs a predetermined amount of said compressed video signal in response to said clock signal; and (g) a counter, coupled to said encoder, to said clock signal generating circuit, to said macroblock labeling circuit and to said rate controller, for receiving said clock signal, said target bit rate signal and said encoder output signal, for counting the number of bits that are in a virtual buffer associated with said video buffer by adding to said count in response to said encoder output signal and subtracting from said count in response to said clock signal and to said target bit rate signal to thereby determine an occupancy of said virtual buffer, and for providing a virtual buffer occupancy signal indicative of said count to said rate controller;

wherein said signal provided by said rate controller to said multi-mode quantizer is also responsive to said virtual buffer occupancy signal such that said selected quantization mode is reflective of said perceptual importance of said object indicated by said virtual buffer capacity as constrained by said storage capacity of said video buffer.

30. The apparatus of claim 29, wherein said virtual buffer occupancy $B_i$ is determined by the equation $B_i = B_{i-1} + b_i - r (R_k/R)$, where $b_i$ is equal to the number of bits used to encode the present macroblock indicated by said encoder output signal, r is equal to the number of bits output by said video buffer indicated by said clock signal, $R_k$ is the target bit rate indicated by said target bit rate signal, and R is the average output bit rate to be maintained by said video buffer.

31. The apparatus of claim 29, wherein said rate controller further comprises a buffer size logic circuit, coupled to said macroblock labeling circuit, for receiving said assigned object and for generating a buffer size modulation signal whenever said assigned object is different from an immediately proceeding assigned object, wherein said signal provided by said rate controller to said multi-mode quantizer is also responsive to said buffer size modulation signal such that said selected quantization mode is reflective of said perceptual importance of said object indicated by said virtual buffer capacity as modulated by said buffer size modulation signal and as constrained by said storage capacity of said video buffer.

32. An apparatus for performing object-based encoding of video information using a depth component of said video information to enhance encoding, comprising:

(a) a depth sensing camera capable of generating in real-time both frames of video information and depth information which corresponds to said video information;

(b) an object segmentation circuit, coupled to said depth sensing camera and receiving said generated depth information, for generating one or more object identification signals based on said received depth information indicative of a shape of one or more objects within said frame of video information; and (c) an encoder, coupled to said object segmentation circuit and to said depth sensing camera and receiving said generated frame of video information which corresponds to said received depth information and said one or more object identification signals, for encoding a video signal representing only a portion of said video information, which portion substantially corresponds to said one or more objects identified by said one or more object identification signals.

33. A method for performing object-based encoding of video information using a depth component of said video information to enhance encoding, comprising the steps of:

(a) receiving frames of video information and depth information which corresponds to said received video information;

(b) generating one or more object identification signals based on said received depth information indicative of a shape of one or more objects within said frame of video information; and (c) encoding a video signal representing only a portion of said received video information, which portion substantially corresponds to said one or more objects identified by said one or more object identification signals.

34. The method of claim 33, wherein step (b) comprises the steps of:

(1) converting said received depth information into an object map to thereby associate each pixel within said frame of video information with one of one or more regions of varying perceptual importance within said frame;

(2) masking said object map to generate a depth region mask indicative of pixels within said frame which substantially correspond to a preselected region;

(3) identifying one or more separate objects within said preselected region indicated by said depth region mask; and (4) generating said one or more object identification signals such that each one of said object identification signals identifies one of said one or more identified separate objects.

35. The method of claim 34, wherein said converting step comprises the steps of:

(i) computing a histogram of said received depth information to thereby provide the number of pixels which have a predetermined depth value for a range of predetermined values;

(ii) setting all values in said histogram which are below a predetermined threshold value to zero to thereby generate a clipped histogram;

(iii) scanning said clipped histogram to find boundaries of n regions with n different threshold depth values; and (iv) quantizing said depth information based on said n different threshold values.

36. The method of claim 34, wherein said identifying step comprises the steps of:

(i) scanning said depth region mask until a pixel with a nonmasked value is found;

(ii) searching neighboring pixels within said mask to find any other neighboring pixels with nonmasked values;

(iii) repeating said searching step until no neighboring pixels have a nonmasked value to identify all neighboring found pixels with nonmasked values as a video object plane which corresponds to an object within said depth region;

(iv) masking said object from said depth region mask; and (v) repeating steps (i)–(iv) until all pixels within said depth region mask are masked to thereby identify one or more video object planes within said received frame of video information.

37. The method of claim 36, wherein said identifying step further comprises the steps of:

(vi) selecting one of said one or more video object planes, and one of one or more video object planes associated with an immediately preceding frame of video information;

(vii) comparing said selected video object plane and said selected previous frame video object plane to determine a depth difference therebetween;

(viii) repeating step (vii) after selecting a different one of said one or more previous frame video object planes unless all of said one or more previous frame video object planes have been selected;

(ix) assigning said selected video object plane to a video object which corresponds to one of said one or more previous frame video object planes for which a depth difference therebetween is minimized as compared to all of said determined depth differences; and (x) repeating steps (vii)–(ix) after selecting a different one of said one or more video object planes unless all of said one or more video object planes have been selected, so that each of said one or more video object planes identifies an object.

38. The method of claim 33, wherein step (c) includes quantizing data which corresponds to a portion of said received fields of video information, and further comprising the step of (d) generating a quantization mode signal based on an object identification signal which corresponds to said data to select a quantization mode reflective of a perceptual importance of an object indicated by said object identification signal, such that said data is quantized based on said selected quantization mode.

39. The method of claim 38, wherein said generated compressed video signal is a variable bit rate signal, and further comprising the steps of:

(e) buffering said generated compressed video signal; and (f) providing a signal indicative of a buffering overflow condition, wherein said quantization mode signal is also responsive to said overflow signal such that said selected quantization mode is reflective of said perceptual importance of said object as constrained by a buffering limitation.

40. The method of claim 39, further comprising the step of assigning, prior to generating said quantization mode signal, a current macroblock of video data within said received frames or fields of video information to one of said objects, wherein said quantization mode signal is reflective of said assigned object.

41. The method of claim 40, further comprising the step of generating a signal indicative of a target bit rate associated with said assigned object prior to generating said quantization mode signal.

42. The method of claim 41, further comprising the steps of:

(i) adding to a virtual buffer count indicative of a virtual buffer occupancy whenever compressed video signal information is buffered;

(ii) subtracting from said count whenever buffered compressed video signal information is output in an amount which dependant on said target bit rate signal; and (iii) generating a virtual buffer occupancy signal indicative of said count, wherein said quantization mode signal is also responsive to said virtual buffer occupancy signal such that said selected quantization mode is reflective of said objects indicated by said virtual buffer occupancy as constrained by said buffering limitation.

43. The method of claim 42, wherein said virtual buffer occupancy $B_i$ is determined by the equation $B_i = B_{i-1} + b_i - r(R_k/R)$, where $b_i$ is equal to the number of bits used to encode the present macroblock indicated by said encoder output signal, r is equal to the number of bits output by said video buffer indicated by said clock signal, $R_k$ is the target bit rate indicated by said target bit rate signal, and R is the average output bit rate required to prevent said buffering limitation from occurring.

44. The method of claim 40, further comprising the step of generating, prior to generating said quantization mode signal, a buffer size modulation signal whenever said assigned object is different from an immediately proceeding assigned object, wherein said quantization mode signal is also responsive to said buffer size modulation signal such that said selected quantization mode is reflective of said object indicated by said virtual buffer capacity as modulated by said buffer size modulation signal and as constrained by said buffering limitation.

45. An object segmentation circuit for receiving depth information which corresponds to a frame of video information, and for identifying one or more separate objects within said frame of video information, comprising:

(a) a object map generation circuit for receiving said depth information, and for converting said depth information into an object map to thereby associate each pixel within said frame of video information with one of one or more regions of varying perceptual importance within said frame, wherein said object map generation circuit comprises:

(1) a histogram generation circuit for receiving said depth information and for computing a histogram of said depth information to thereby provide the number of pixels which have a predetermined depth value for a range of predetermined values;

(2) a first logic circuit, coupled to said histogram generation circuit, for receiving said generated histogram and for setting all values in said histogram which are below a predetermined threshold value to zero to thereby generate a clipped histogram;

(3) a second logic circuit, coupled to said first logic circuit, for receiving said clipped histogram and for scanning said clipped histogram to find boundaries of n regions with n different threshold depth values; and (4) a variable step quantization circuit, coupled to said second logic circuit, for receiving said n different threshold values and said depth information, and for quantizing said depth information based on said n different threshold values, to thereby generate said object map;

(b) a region masking circuit, coupled to said object map generation circuit and receiving said object map, for masking said object map to generate one or more depth region masks indicative of pixels within said frame which substantially correspond to preselected regions of depth; and (c) a video object selection circuit, coupled to said region masking circuit and receiving said generated one or more region masks, for identifying one or more separate objects within each of said one or more preselected regions indicated by each of said one or more region masks, such that each object associated with each depth region is identified as a separate object.

46. The apparatus of claim 45, wherein said histogram generation circuit comprises:

(i) a buffer for receiving and temporarily storing said depth information;

(ii) a memory, coupled to said buffer, for receiving said depth information from said buffer as memory addresses and for storing histogram values as said memory addresses; and (iii) a logic circuit, coupled to said memory, for reading a histogram value from said memory at an address location, updating said histogram value, and providing said updated histogram value to said memory at said address location.

47. A method for identifying one or more separate objects within depth information which corresponds to a frame of video information, comprising the steps of:

(a) receiving said depth information;

(b) converting said received depth information into an object map to thereby associate each pixel within said frame of video information with one of one or more regions of varying perceptual importance within said frame, wherein said converting step comprises the steps of:

(1) computing a histogram of said received depth information to thereby provide the number of pixels which have a predetermined depth value for a range of predetermined values;

(2) setting all values in said histogram which are below a predetermined threshold value to zero to thereby generate a clipped histogram;

(3) scanning said clipped histogram to find boundaries of n regions with n different threshold depth values; and (4) quantizing said depth information based on said n different threshold values;

(c) masking said object map to generate one or more depth region masks indicative of pixels within said frame which substantially correspond to preselected regions of depth; and (d) identifying one or more separate objects within each of said one or more preselected regions indicated by said one or more region masks, such that each object associated with each depth region is identified as a separate object.

48. The method of claim 47, wherein said identifying step comprises the steps of:

(i) scanning a preselected depth region mask until a pixel with a nonmasked value is found;

(ii) searching neighboring pixels within said mask to find any other neighboring pixels with nonmasked values;

(iii) repeating said searching step until no neighboring pixels have a nonmasked value to identify all neighboring found pixels with nonmasked values as a video object plane which corresponds to an object within said depth region;

(iv) masking said object from said depth region mask; and (v) repeating steps (i)–(iv) until all pixels within said depth region mask are masked to thereby identify one or more video object planes within said received frame of video information.

49. The method of claim 48, wherein said identifying step further comprises the steps of:

(vi) selecting one of said one or more video object planes, and one of one or more video object planes associated with an immediately preceding frame of video information;

(vii) comparing said selected video object plane and said selected previous frame video object plane to determine a depth difference therebetween;

(viii) repeating step (vii) after selecting a different one of said one or more previous frame video object planes unless all of said one or more previous frame video object planes have been selected;

(ix) assigning said selected video object plane to a video object which corresponds to one of said one or more previous frame video object planes for which a depth difference therebetween is minimized as compared to all of said determined depth differences; and (x) repeating steps (vii)–(ix) after selecting a different one of said one or more video object planes unless all of said one or more video object planes have been selected, so that each of said one or more video object planes identifies an object.

* * * * *

UNITED STATES PATENT AND TRADEMARK OFFICE
CERTIFICATE OF CORRECTION

PATENT NO. : 6,055,330

DATED : April 25, 2000

INVENTOR(S) : Eleftheriadis et al.

It is certified that error appears in the above-identified patent and that said Letters Patent is hereby corrected as shown below:

On the Cover:
[57] ABSTRACT, line 3: "fleid" should read --field--;
[57] ABSTRACT, line 4: "includes" should read --including-- (syntax);

Column 21, line 36: "proceeding" should read --preceding--;
Column 22, line 15: "three" should read --depth--;
Column 22, line 64: "an" should read --a--;
Column 23, line 12: "which dependant" should read --which is dependent--;
Column 24, line 52: "an" should be deleted;
Column 25, line 62: "proceeding" should read --preceding--;
Column 28, line 15: "which dependant" should read --which is dependant--;
Column 28, line 32: "proceeding" should read --preceding--;

UNITED STATES PATENT AND TRADEMARK OFFICE
CERTIFICATE OF CORRECTION

PATENT NO. : 6,055,330

DATED : April 25, 2000

INVENTOR(S) : Eleftheriadis et al.

It is certified that error appears in the above-identified patent and that said Letters Patent is hereby corrected as shown below:

Column 3, line 16: "the" should read --they--;
Column 8, line 4: "cowers" should read --coarse--;
Column 11, line 18: "identifications" should read --identification--;
Column 11, line 56: "by" should read --be--;
Column 12, line 62: "f(.)," should read --f( ),--;
Column 13, line 26: "B'" should read --$B_i$--;
Column 13, line 34: "B'" should read --$B_i$--;
Column 16, line 31: "of " should read --Of--;
Column 18, line 19: "it's" should read --its--;

Signed and Sealed this

Fifteenth Day of May, 2001

Attest:

NICHOLAS P. GODICI

Attesting Officer    Acting Director of the United States Patent and Trademark Office